US011753505B2

(12) United States Patent
Birau et al.

(10) Patent No.: US 11,753,505 B2
(45) Date of Patent: Sep. 12, 2023

(54) POLYAMIDES WITH PENDENT OPTICAL ABSORBERS AND RELATED METHODS

(71) Applicant: Xerox Corporation, Norwalk, CT (US)

(72) Inventors: Mihaela Maria Birau, Hamilton (CA); Valerie M. Farrugia, Oakville (CA)

(73) Assignee: Xerox Corporation, Norwalk, CT (US)

( * ) Notice: Subject to any disclaimer, the term of this patent is extended or adjusted under 35 U.S.C. 154(b) by 192 days.

(21) Appl. No.: 16/916,336

(22) Filed: Jun. 30, 2020

(65) Prior Publication Data

US 2021/0070937 A1 Mar. 11, 2021

Related U.S. Application Data

(60) Provisional application No. 62/897,534, filed on Sep. 9, 2019.

(51) Int. Cl.
*C08G 69/48* (2006.01)
(52) U.S. Cl.
CPC .................................. *C08G 69/48* (2013.01)
(58) Field of Classification Search
CPC ..... C08G 69/46; C08G 69/48; C08L 2666/32; C08L 2666/78
See application file for complete search history.

(56) References Cited

U.S. PATENT DOCUMENTS

| | | | |
|---|---|---|---|
| 3,699,183 | A | 10/1972 | Hermann |
| 4,863,646 | A | 9/1989 | Watanabe et al. |
| 5,859,075 | A | 1/1999 | Shukla et al. |
| 5,990,290 | A | 11/1999 | Phillips |
| 7,740,938 | B2 | 6/2010 | Helft et al. |
| 8,822,555 | B2 | 9/2014 | Kaiso et al. |
| 10,655,025 | B2 | 5/2020 | Farrugia et al. |
| 2007/0107145 | A1 | 5/2007 | Good, Jr. |
| 2011/0229545 | A1 | 9/2011 | Shum et al. |
| 2014/0144348 | A1 | 5/2014 | Birau et al. |
| 2015/0152214 | A1 | 6/2015 | Uenlue |
| 2017/0129177 | A1 | 5/2017 | Hättig et al. |

FOREIGN PATENT DOCUMENTS

| | | |
|---|---|---|
| CN | 104194326 A | 12/2014 |
| DE | 10 2017 102137 | 8/2015 |
| EP | 0 866 088 A | 9/1998 |
| EP | 2098574 A2 | 9/2009 |
| JP | 2002080629 A | 3/2002 |
| NL | 132149 B * | 7/1971 |
| WO | 1999067224 A1 | 12/1999 |
| WO | 2015/109143 A | 7/2015 |
| WO | 2019073030 A1 | 4/2019 |

OTHER PUBLICATIONS

NL 132149 B translation (Jul. 1991).*
EP office action for related matter 20193758.8 dated Feb. 11, 2021.
H. Patil, et al. Hot-melt extrusion: from theory to application in pharmaceutical applicaitons, AAPS PharmSciTech, vol. 17, No. 1, pp. 20-42, Feb. 2016.
U. Sundararaj, et al. Drop breakup and coalescence in polymer blends: the effects of concentration and compatibilization, Macromolecules 1995, 28, 2647-2657.
R G Kleijnen, et al., Production and Processing of a Spherical Polybutylene Terephthalate Powder for Laser Sintering, Appl. Sci. 2019, 9(7), 1308.
I. Pillin, et al. Crystallization kinetics of poly(butylene terephthalate) (PBT): Influence of additives and free carboxylic acid chain ends. Polym. Eng. Sci 2001, 41, 178-191.
S Fanselow, et al. AIP Conference Proceedings 1713, 140007 (2016)—Production of micron-sized polymer particles for additive manufacturing by melt emulsification.
M Schmid, et al., AIP Conference Proceedings 1664, 160009 (2015)—Polymer powders for selective laser sintering (SLS).
M Schmid, et al., Additive Manufacturing: Polymers Applicable for Laser Sintering (LS), Procedia Engineering 149 (2016) 457-464.

* cited by examiner

*Primary Examiner* — Ana L. Woodward
(74) *Attorney, Agent, or Firm* — Vorys, Sater, Seymour, and Pease LLP

(57) ABSTRACT

Methods for producing a polyamide having an optical absorber pendent from the polyamide's backbone (OAMB-polyamide) may comprise: esterifying a hydroxyl-pendent optical absorber with a halogen-terminal aliphatic acid to yield a halogen-terminal alkyl-optical absorber; and N-alkylating a polyamide with the halogen-terminal alkyl-optical absorber to yield the OAMB-polyamide. Other methods for producing an OAMB-polyamide may comprise: esterifying a carboxyl-pendent optical absorber with a halogen-terminal aliphatic alcohol to yield a halogen-terminal alkyl-optical absorber; and N-alkylating a polyamide with the modified optical absorber to yield a polyamide having the OAMB-polyamide.

12 Claims, 1 Drawing Sheet

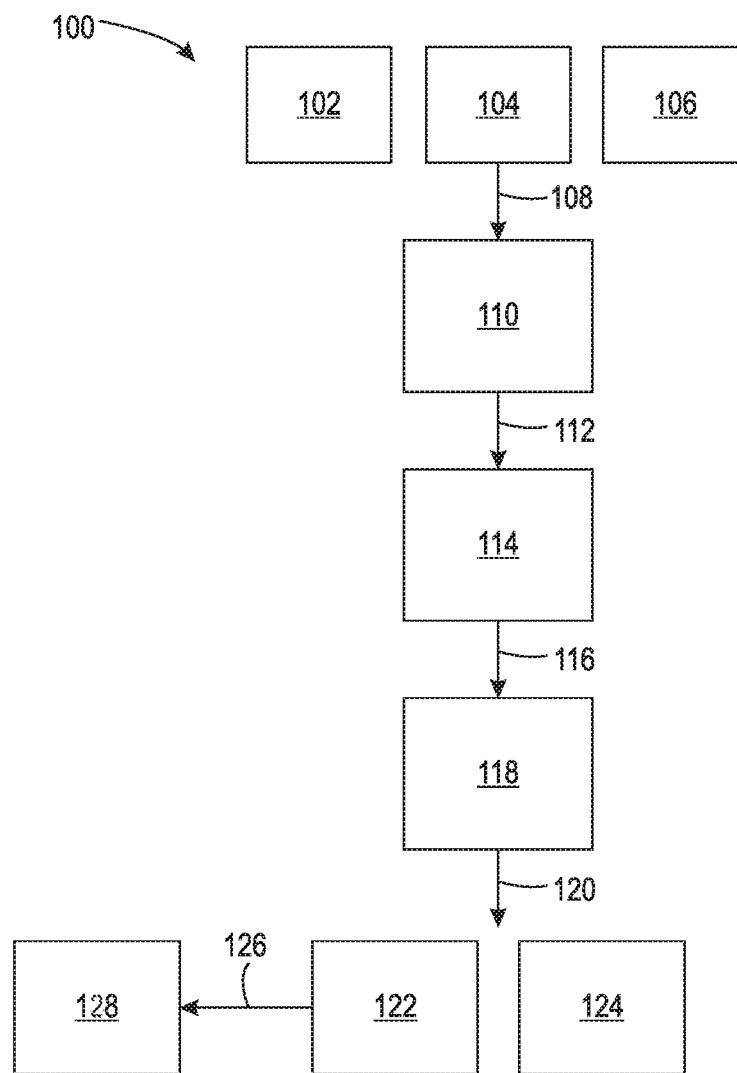

POLYAMIDES WITH PENDENT OPTICAL ABSORBERS AND RELATED METHODS

CROSS-REFERENCE TO RELATED APPLICATIONS

The present application claims the benefit of priority under 35 U.S.C. § 119 from U.S. Provisional Patent Application 62/897,534, filed on Sep. 9, 2019 and incorporated herein by reference in its entirety.

TECHNICAL FIELD

The present disclosure relates to compositions, synthesis methods, and applications of polyamides having an optical absorber pendent from the backbone of the polyamide. For example, particles may comprise a polyamide having an optical absorber pendent from the backbone of the polyamide.

BACKGROUND

Thermoplastic polymers are often used to make extruded objects like films, bags, particles, and filaments. One example of a thermoplastic polymer is a polyamide. Polyamides like nylons are off-white colored polymers that have the ability to withstand elevated or low temperatures without loss of physical properties. Therefore, objects formed with polyamides can be used in demanding applications like power tools, automotive parts, gears, and appliance parts. In some instances, the application may call for the polyamide-made part to be colored. Because pigments are particulates, pigments can be difficult to homogeneously mix in the polyamide, which causes the coloring of the resultant part to be uneven.

One application where homogeneous incorporation of pigments is especially important is the rapidly growing technology area of three-dimensional (3-D) printing, also known as additive manufacturing. Although 3-D printing has traditionally been used for rapid prototyping activities, this technique is being increasingly employed for producing commercial and industrial objects, which may have entirely different structural and mechanical tolerances than do rapid prototypes.

3-D printing operates by depositing either (a) small droplets or streams of a melted or solidifiable material or (b) powder particulates in precise deposition locations for subsequent consolidation into a larger object, which may have any number of complex shapes. Such deposition and consolidation processes typically occur under the control of a computer to afford layer-by-layer buildup of the larger object. In a particular example, consolidation of powder particulates may take place in a 3-D printing system using a laser to promote selective laser sintering (SLS).

Powder particulates usable in 3-D printing include thermoplastic polymers, including thermoplastic elastomers, metals and other solidifiable substances. One example thermoplastic polymer is nylon. Nylons are off-white colored polymers that have the ability to withstand elevated or low temperatures without loss of physical properties. Therefore, nylons can be used in demanding applications like power tools, automotive parts, gears, and appliance parts.

When using a particulate pigment in 3-D printing, the particulates should be evenly dispersed throughout the small melted droplets or the power particulate, or the coloring of the final object will be uneven.

SUMMARY OF INVENTION

The present disclosure relates to compositions, synthesis methods, and applications of polyamides having an optical absorber pendent from the backbone of the polyamide. For example, particles may comprise a polyamide having an optical absorber pendent from the backbone of the polyamide.

Disclosed herein are methods that comprise: esterifying a hydroxyl-pendent optical absorber with a halogen-terminal aliphatic acid to yield a halogen-terminal alkyl-optical absorber; and N-alkylating a polyamide with the halogen-terminal alkyl-optical absorber to yield a polyamide having an optical absorber pendent from the polyamide's backbone (OAMB-polyamide).

Disclosed herein are methods that comprise: esterifying a carboxyl-pendent optical absorber with a halogen-terminal aliphatic alcohol to yield a halogen-terminal alkyl-optical absorber; and N-alkylating a polyamide with the modified optical absorber to yield an OAMB-polyamide.

Disclosed herein are articles that comprise: a polyamide having an optical absorber pendent from a backbone of the polyamide produced according to the methods described herein.

Disclosed herein are methods that comprise: extruding a polymer melt comprising the polyamide produced according to the methods described herein through an orifice to produce a film, a fiber (or a filament), particles, pellets, or the like.

Disclosed herein are compositions that comprise: a polyamide having an optical absorber pendent from a backbone of the polyamide, wherein the polyamide and the optical absorber are connected by an alkyl linker.

Disclosed herein are articles that comprise: a polyamide having an optical absorber pendent from a backbone of the polyamide, wherein the polyamide and the optical absorber are connected by an alkyl linker.

Disclosed herein are methods that comprise: extruding a polymer melt comprising a polyamide having an optical absorber pendent from a backbone of the polyamide, wherein the polyamide and the optical absorber are connected by an alkyl linker, through an orifice to produce a film, a fiber (or a filament), particles, pellets, or the like.

Disclosed herein are methods that comprise: mixing a mixture comprising an OAMB-polyamide, a carrier fluid that is immiscible with the OAMB-polyamide, and optionally an emulsion stabilizer at a temperature greater than a melting point or softening temperature of the OAMB-polyamide and at a shear rate sufficiently high to disperse the OAMB-polyamide in the carrier fluid; and cooling the mixture to below the melting point or softening temperature of the OAMB-polyamide to form solidified particles comprising the OAMB-polyamide and the emulsion stabilizer, when present, associated with an outer surface of the solidified particles.

Disclosed herein are compositions that comprise: particles comprising an OAMB-polyamide and having a circularity of about 0.90 to about 1.0.

Also disclosed herein are methods that comprise: depositing OAMB-polyamide particles described herein optionally in combination with other thermoplastic polymer particles upon a surface in a specified shape; and once deposited, heating at least a portion of the particles to promote consolidation thereof and form a consolidated body.

BRIEF DESCRIPTION OF THE DRAWINGS

The following FIGURES are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

The FIGURE a flow chart of a nonlimiting example method of the present disclosure.

DETAILED DESCRIPTION

The present disclosure relates to polyamides having an optical absorber pendent from the backbone of the polyamide and related methods. More specifically, the methods herein first esterify an optical absorber with a halogen-terminal alkyl by forming an ester bond between (a) a halogen-terminal aliphatic acid or a halogen-terminal alcohol and (b) a hydroxyl group or carboxyl group, respectively, of the optical absorber to yield a halogen-terminal alkyl-optical absorber. Then, the polyamide backbone is alkylated with the halogen-terminal alkyl-optical absorber. The result is a polyamide having an optical absorber pendent from the backbone of the polyamide, also referred to herein as an optical absorber-modified backbone of a polyamide or OAMB-polyamide. Because the optical absorber is pendent from the backbone of the polyamide, objects produced by additive manufacturing methods that include these particles should maintain an even color over time because the optical absorber cannot migrate within or leach from the object.

The present disclosure also relates to particles comprising a polyamide having an optical absorber pendent from the backbone of the polyamide (also referred to herein as an optical absorber-modified backbone of a polyamide or OAMB-polyamide) and related methods. More specifically, the present disclosure includes methods of making highly spherical polymer particles comprising the one or more OAMB-polyamides and optionally one or more other thermoplastic polymers. Said polymer particles may be useful, among other things, as starting material for additive manufacturing.

The polymer particles described herein are produced by melt emulsification methods where one or more OAMB-polyamides and optionally one or more additional thermoplastic polymers are dispersed as a melt in a carrier fluid that is immiscible with the OAMB-polyamide and additional thermoplastic polymers, if used. A sufficient amount of shear is applied to the mixture to cause the polymer melt to form droplets in the carrier fluid.

Because the optical absorber is pendent from the backbone of the polyamide, objects produced by additive manufacturing methods that include these particles should maintain an even color over time because the optical absorber cannot migrate within or leach from the object.

Definitions and Test Methods

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid at room temperature and has a melting point of 65° C. Therefore, said polyethylene oxide is immiscible with a material that is liquid at room temperature if said material and said polyethylene oxide have less than 5 wt % solubility in each other at 65° C.

As used herein, the term "optical absorber" refers to a molecule or portion thereof that absorbs ultraviolet or visible light.

As used herein, the term "chromophore" refers to an optical absorber where the light absorption imparts color.

As used herein, the term "fluorophore" refers to an optical absorber that re-emits an absorbed photon at a different wavelength.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

As used herein, the terms "associated," "association," and grammatical variations thereof between emulsion stabilizers and a surface refers to chemical bonding and/or physical adherence of the emulsion stabilizers to the surface. Without being limited by theory, it is believed that the associations described herein between polymers and emulsion stabilizers are primarily physical adherence via hydrogen bonding and/or other mechanisms. However, chemical bonding may be occurring to some degree.

As used herein, the term "embed" relative to nanoparticles and a surface of a polymer particle refers to the nanoparticle being at least partially extended into the surface such that polymer is in contact with the nanoparticle to a greater degree than would occur if the nanoparticle were simply laid on the surface of the polymer particle.

Herein, D10, D50, D90, and diameter span are primarily used herein to describe particle sizes. As used herein, the term "D10" refers to a diameter at which 10% of the sample (on a volume basis unless otherwise specified) is comprised of particles having a diameter less than said diameter value. As used herein, the term "D50" refers to a diameter at which 50% of the sample (on a volume basis unless otherwise specified) is comprised of particles having a diameter less than said diameter value. As used herein, the term "D90" refers to a diameter at which 90% of the sample (on a volume basis unless otherwise specified) is comprised of particles having a diameter less than said diameter value.

As used herein, the terms "diameter span" and "span" and "span size" when referring to diameter provides an indication of the breadth of the particle size distribution and is calculated as (D90-D10)/D50 (again each D-value is based on volume, unless otherwise specified).

Particle size can be determined by light scattering techniques using a Malvern MASTERSIZER™ 3000 or analysis of optical digital micrographs. Unless otherwise specified, light scattering techniques are used for analyzing particle size.

For light scattering techniques, the control samples were glass beads with a diameter within the range of 15 μm to 150 μm under the tradename Quality Audit Standards QAS4002™ obtained from Malvern Analytical Ltd. Samples were analyzed as dry powders, unless otherwise indicated. The particles analyzed were dispersed in air and analyzed using the AERO S dry powder dispersion module with the MASTERSIZER™ 3000. The particle sizes were derived using instruments software from a plot of volume density as a function of size.

Particle size measurement and diameter span can also be determined by optical digital microscopy. The optical images are obtained using a Keyence VHX-2000 digital microscope using version 2.3.5.1 software for particle size analysis (system version 1.93).

As used herein, when referring to sieving, pore/screen sizes are described per U.S.A. Standard Sieve (ASTM E11-17).

As used herein, the terms "circularity" and "sphericity" relative to the particles refer to how close the particle is to a perfect sphere. To determine circularity, optical microscopy images are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is CEA/P, where CEA is the circumference of a circle having the area equivalent to the area (A) of the actual particle.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min. ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by "Carr Indices."

Hausner ratio ($H_r$) is a measure of the flowability of a powder and is calculated by $H_r=\rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids is the kinematic viscosity at 25° C., unless otherwise specified, measured per ASTM D445-19. For commercially procured carrier fluids (e.g., PDMS oil), the kinematic viscosity data cited herein was provided by the manufacturer, whether measured according to the foregoing ASTM or another standard measurement technique.

Optical Absorber-Modified Polyamides

The present disclosure relates to polyamides having an optical absorber pendent from the backbone of the polyamide and related methods.

Examples of polyamides include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), semi-aromatic polyamide, aromatic polyamides (aramids), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10, 36, PA 11/6,36, PA 10,10/10,36, PA 6T/6,6, and the like, and any combination thereof. Examples of polyamide elastomers include, but are not limited to, polyesteramide, polyetheresteramide, polycarbonate-esteramide, and polyether-block-amide elastomers. Herein, a polyamide followed by a single number is a polyamide having that number of backbone carbons between each nitrogen. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is $[NH-(CH_2)_6-NH-CO-(CH_2)_8-CO]_n$. A polyamide followed by number(s) backslash number(s) are a copolymer of the polyamides indicated by the numbers before and after the backslash.

Optical absorbers may be from known families including, but not limited to, rhodamines, fluoresceins, coumarins, naphthalimides, benzoxanthenes, acridines, cyanines, oxazins, phenanthridine, pyrrole ketones, benzaldehydes, polymethines, triarylmethanes, anthraquinones, pyrazolones, quinophthalones, carbonyl dyes, diazo dyes, perinones, diketopyrrolopyrrole (DPP), dioxazine dyes, phthalocyanines, indanthrenes, benzanthrone, violanthrones, azo dyes, phthalocyanine dyes, quinacridone dyes, anthraquinone dyes, dioxagine dyes, indigo dyes, thioindigo dyes, perynone dyes, perylene dyes, isoindolene dyes, aromatic amino acids, flavins, derivatives of pyridoxyl, derivatives of chlorophyll, and the like, and any combination thereof. Optical absorbers should be chosen to be hydroxyl-pendent and/or carboxyl-pendent based on the synthesis scheme implemented.

In a first nonlimiting example embodiment of the present disclosure, an OAMB-polyamide may be produced by esterifying a hydroxyl-pendent optical absorber with a halogen-terminal aliphatic acid to yield a halogen-terminal alkyl-optical absorber; and reacting a polyamide with the halogen-terminal alkyl-optical absorber to yield an OAMB-polyamide.

In a second nonlimiting example embodiment of the present disclosure, an OAMB-polyamide may be produced by esterifying a carboxyl-pendent optical absorber with a halogen-terminal aliphatic alcohol to yield a halogen-terminal alkyl-optical absorber; and reacting a polyamide with the halogen-terminal alkyl-optical absorber to yield an OAMB-polyamide. Herein, anhydride moieties are considered carboxylic acid moieties because the anhydrides open to carboxylic acids during synthesis.

Scheme 1 is a nonlimiting example of a hydroxyl-pendent optical absorber (illustrated specifically as alizarin) reaction with a $C_2$ to $C_{18}$ halogen-terminal aliphatic acid (illustrated as a bromo-substituted aliphatic acid where n is 1 to 17) to yield a halogen-terminal alkyl-optical absorber.

Scheme 1

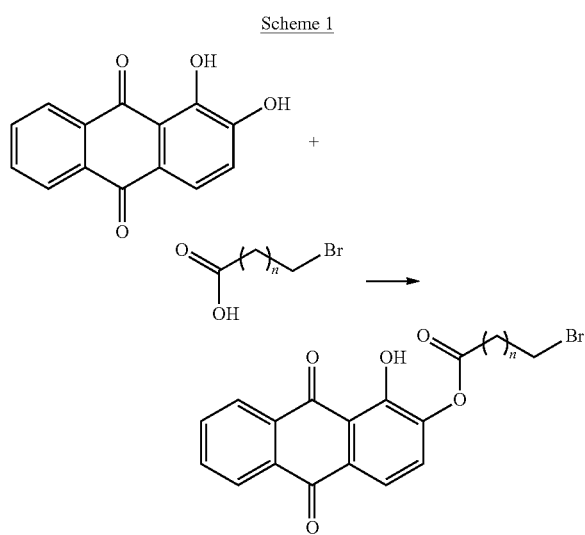

Examples of hydroxyl-pendent optical absorbers include, but are not limited to, 1,2-dihydroxyanthraquinone (also known as alizarin); carminic acid; 1,3-dihydroxyanthraquinone; 1,4-dihydroxyanthraquinone; 1-hydroxy-4-(p-tolylamino)anthraquinone (also known as oil violet and Solvent Violet 13); 1,8-dihydroxy-3-methoxy-6-methylanthraquinone (also known as parietin); 1,2,5-trihydroxy-6-methylanthracene-9,10-dione (also known as morindone); calcein (also known as flourexon); 6-carboxyfluorescein succinimidyl ester; 6-carboxyfluorescein (also known as 6-FAM); 2',7'-dichloro-3',6'-dihydroxy-3H-spiro[2-benzofuran-1,9'-xanthen]-3-one (also known as dichlorofluorescein); fluorescein isothiocyanate; 4',5'-dibromofluorescein; 5(6)-carboxy-2',7'-dichlorofluorescein; 4-chloro-3-[(2Z)-2-[1-[5-chloro-4-[[(2Z)-2-[[2-chloro-5-[N-[2-(4-chlorophenoxy)-5-(trifluoromethyl)phenyl]-C-hydroxycarbonimidoyl]phenyl]hydrazinylidene]-3-oxobutanoyl]amino]-2-methylanilino]-1,3-dioxobutan-2-ylidene]hydrazinyl]-N-[2-(4-chlorophenoxy)-5-(trifluoromethyl)phenyl]benzenecarboximidic acid (also known as Disazo Yellow GG and Pigment Yellow 128); 2-[(3-carboxy-2-oxidonaphthalen-1-yl)diazenyl]-4-chloro-5-methylbenzenesulfonate disodium (also known as Wachtung Red B and Pigment Red 48); phenol dyes; 3,3-bis(4-hydroxyphenyl)-2-benzofuran-1-one (also known as phenolphthalein); 4,8-diamino-1,5-dihydroxy-9,10-dioxoanthracene-2-sulfonate sodium (also known as Acid Blue 43); 1-amino-4-hydroxy-2-phenoxyanthracene-9,10-dione (also known as Disperse Red 60); 5-oxo-1-(4-sulfonatophenyl)-4-[(4-sulfonatophenyl)diazenyl]-4H-pyrazole-3-carboxylate trisodium (also known as tartrazine); 5-chloro-2-hydroxy-3-[(3-methyl-5-oxo-1-phenyl-4H-pyrazol-4-yl)diazenyl]benzenesulfonate sodium (also known as mordant red 19); 2-[(4-hydroxy-9,10-dioxoanthracen-1-yl)amino]-5-methylbenzenesulfonic acid sodium (also known as alizarin irisol r); 3,5,6,8-tetrahydroxy-1-methyl-9,10-dioxo-7-[3,4,5-trihydroxy-6-(hydroxymethyl)oxan-2-yl]anthracene-2-carboxylic acid (also known as carmine); and the like; and any combination thereof.

Preferably the hydroxyl-pendent optical absorbers have one or two hydroxyls. Examples of hydroxyl-pendent optical absorbers include, but are not limited to, alizarin; 1,3-dihydroxyanthraquinone; 1,4-dihydroxyanthraquinone; 1,2,4-trihydroxyanthraquinone; 1-hydroxy-4-(p-tolylamino) anthraquinone; 1,8-dihydroxy-3-methoxy-6-methylanthraquinone; calcein; 6-carboxyfluorescein succinimidyl ester; 6-carboxyfluorescein; 2',7'-dichloro-3',6'-dihydroxy-3H-spiro[2-benzofuran-1,9'-xanthen]-3-one; fluorescein isothiocyanate; 4',5'-dibromofluorescein; 4-chloro-3-[(2Z)-2-[1-[5-chloro-4-[[(2Z)-2-[[2-chloro-5-[N-[2-(4-chlorophenoxy)-5-(trifluoromethyl)phenyl]-C-hydroxycarbonimidoyl]phenyl]hydrazinylidene]-3-oxobutanoyl]amino]-2-methylanilino]-1,3-dioxobutan-2-ylidene] hydrazinyl]-N-[2-(4-chlorophenoxy)-5-(trifluoromethyl) phenyl]benzenecarboximidic acid; 2-[(3-carboxy-2-oxidonaphthalen-1-yl)diazenyl]-4-chloro-5-methylbenzenesulfonate disodium; phenol dyes; 3,3-bis(4-hydroxyphenyl)-2-benzofuran-1-one; 4,8-diamino-1,5-dihydroxy-9,10-dioxoanthracene-2-sulfonate sodium; 1-amino-4-hydroxy-2-phenoxyanthracene-9,10-dione; 5-oxo-1-(4-sulfonatophenyl)-4-[(4-sulfonatophenyl)diazenyl]-4H-pyrazole-3-carboxylate trisodium; 5-chloro-2-hydroxy-3-[(3-methyl-5-oxo-1-phenyl-4H-pyrazol-4-yl)diazenyl]benzenesulfonate sodium; 2-[(4-hydroxy-9,10-dioxoanthracen-1-yl)amino]-5-methylbenzenesulfonic acid sodium; and the like; and any combination thereof.

$C_2$ to $C_{18}$ halogen-terminal aliphatic acids may have the general structure of $X-(CH_2)_n-COOH$ where X is bromo or chloro (probably bromo) and n is 1-17 (preferably 1-5). Specific examples of $C_2$ to $C_{18}$ halogen-terminal aliphatic acids include, but are not limited to, bromoacetic acid, chloroacetic acid, 3-bromopropionic acid, 3-chloropropionic acid, 4-bromobutyric acid, 4-chlorobutyric acid, 5-bromovaleric acid, 5-chlorovaleric acid, 6-bromohexanoic acid, 6-chlorohexanoic acid, bromo-polyethyleneglycol$_1$-carboxylic acid (bromo-PEG$_1$-acid), bromo-PEG$_2$-acid, bromo-PEG$_3$-acid, bromo-PEG$_4$-acid, bromo-PEG$_5$-acid, bromo-PEG$_1$-CH$_2$COOH, bromo-PEG$_3$-CH$_2$COOH, and the like, and any combination thereof.

Scheme 2 is a nonlimiting example of a carboxyl-pendent optical absorber (illustrated specifically as 6-carboxyfluorescein) reaction with a $C_2$ to $C_{18}$ halogen-terminal aliphatic alcohol (illustrated as a bromo-substituted aliphatic alcohol where n is 1 to 17) to yield a halogen-terminal alkyl-optical absorber. Herein, anhydride moieties are considered carboxylic acid moieties because the anhydrides open to carboxylic acids during synthesis.

Scheme 2

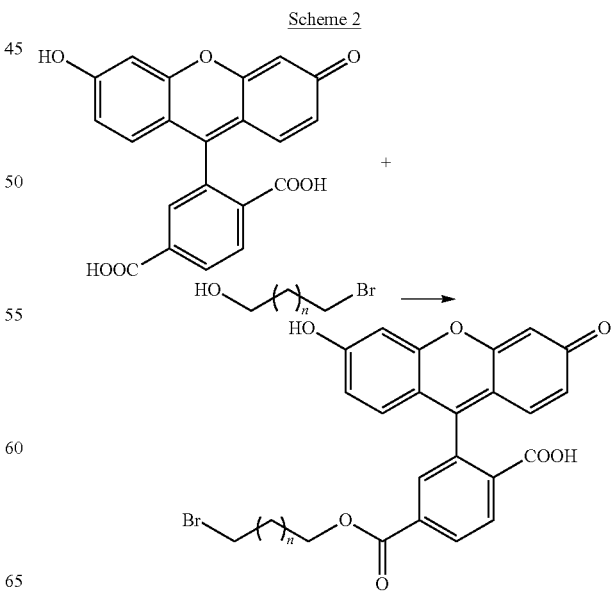

Examples of carboxyl-pendent optical absorbers include, but are not limited to, calcein (also known as flourexon); 5(6)-carboxyfluorescein; 6-carboxyfluorescein (also known as 6-FAM); 5(6)-carboxyfluorescein-N-hydroxysuccinimide ester; 2-pyrenepropanoic acid; 2-perylenepropanoic acid; 3,9-perylenedicarboxylic acid; 5(6)-carboxy-2',7'-dichlorofluorescein; calcein blue; 2-[(3-carboxy-2-oxidonaphthalen-1-yl)diazenyl]-4-chloro-5-methylbenzenesulfonate disodium; 5-oxo-1-(4-sulfonatophenyl)-4-[(4-sulfonatophenyl)diazenyl]-4H-pyrazole-3-carboxylate trisodium; and the like; and any combination thereof.

Preferably, the carboxyl-pendent optical absorbers have one or two carboxyls. Examples of such carboxyl-pendent optical absorbers include, but are not limited to, 5(6)-carboxyfluorescein; 6-carboxyfluorescein; 5(6)-carboxyfluorescein-N-hydroxysuccinimide ester; 2-pyrenepropanoic acid; 2-perylenepropanoic acid; 3,9-perylenedicarboxylic acid; 5(6)-carboxy-2',7'-dichlorofluorescein; calcein blue; 2-[(3-carboxy-2-oxidonaphthalen-1-yl)diazenyl]-4-chloro-5-methylbenzenesulfonate disodium; 5-oxo-1-(4-sulfonatophenyl)-4-[(4-sulfonatophenyl)diazenyl]-4H-pyrazole-3-carboxylate trisodium; and the like; and any combination thereof.

$C_2$ to $C_{18}$ halogen-terminal aliphatic alcohols may have the general structure of X—$(CH_2)_n$—OH where X is bromo or chloro (probably bromo) and n is 2-18 (preferably 2-6). Specific examples of $C_2$ to $C_{18}$ halogen-terminal aliphatic alcohols include, but are not limited to, 3-bromoethan-1-ol, 3-chloroethan-1-ol, 4-bromopropan-1-ol, 4-chloropropan-1-ol, 5-bromopbutan-1-ol, 5-chlorobutan-1-ol, 6-bromopentan-1-ol, 6-chloropentan-1-ol, 7-bromohexan-1-ol, 7-chlorohexan-1-ol, and the like, and any combination thereof.

Esterification in Scheme 1 or Scheme 2 may be achieved with Steglich esterification, which uses dicyclohexylcarbodiimide (DCC) as a coupling reagent and 4-dimethylaminopyridine (DMAP) as a catalyst.

The esterification in Scheme 1 or Scheme 2 may be performed at about 0° C. to about 70° C. (or about 0° C. to about 30° C., or about 20° C. to about 40° C., or about 30° C. to about 70° C.).

The esterification in Scheme 1 or Scheme 2 may be performed for about 10 minutes to about 24 hours (or about 10 minutes to about 6 hours, or about 2 hours to about 12 hours, or about 6 hours to about 24 hours).

The esterification in Scheme 1 or Scheme 2 may be performed in a solvent that includes, but is not limited to, dichloromethane, dimethyl sulfoxide (DMSO), N,N-dimethylformamide, acetonitrile, tetrahydrofuran, and the like, and any combination thereof.

The molar ratio of the hydroxyl-pendent optical absorber to the halogen-terminal aliphatic acid is preferably about 5:1 to about 1:5 (or about 5:1 to about 1:5, or about 5:1 to about 1:5, or about 5:1 to about 1:5). The molar ratio of the carboxyl-pendent optical absorber to the halogen-terminal aliphatic alcohol is preferably about 5:1 to about 1:5 (or about 5:1 to about 1:5, or about 5:1 to about 1:5, or about 5:1 to about 1:5).

Generally, the foregoing molar ratios are preferably at or close to about 1:1 (e.g., about 2:1 to about 1:2) because many of the optical absorbers have more than one hydroxyl group or more than one carboxyl group. Being at or close to about 1:1 molar ratio mitigates esterifying the optical absorber at more than one location, which would yield a halogen-terminal alkyl-optical absorber that is likely to act as a crosslinker when reacted with a polyamide.

After the halogen-terminal alkyl-optical absorber is formed by Scheme 1 or Scheme 2, a polyamide is N-alkylated with the halogen-terminal alkyl-optical absorber. Continuing with the nonlimiting example in Scheme 1, Scheme 3 illustrates a reaction between the halogen-terminal alkyl-optical absorber (halogen-terminal alkyl-alizarin) and a polyamide (illustrated as nylon 6) to yield an OAMB-polyamide (illustrated as an alizarin-pendent nylon 6).

Scheme 3

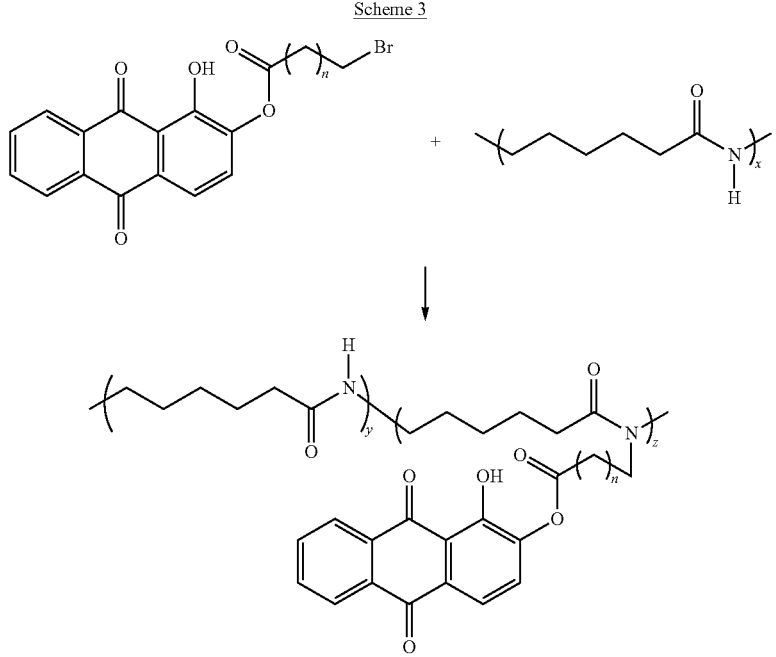

N-alkylation in Scheme 3 is performed in the presence of a strong base. Examples of strong bases include, but are not limited to, sodium t-butoxide, potassium t-butoxide, magnesium t-butoxide, calcium t-butoxide, sodium t-amylate, sodium 2-methyl-2-butoxide, alkali metal amides (e.g., sodium amide, potassium amide, lithium diethylamide, and lithium diisopropylamide), sodium hydride, lithium hydride, triphenylmethyl lithium, triphenylmethyl sodium, naphthalene sodium, triphenylmethyl potassium, and the like, and any combination thereof.

The N-alkylation in Scheme 3 may be performed at about 100° C. to about 200° C. (or about 100° C. to about 150° C., or about 125° C. to about 175° C., or about 150° C. to about 200° C.).

The N-alkylation in Scheme 3 may be performed for about 10 minutes to about 48 hours (or about 10 minutes to about 6 hours, or about 2 hours to about 12 hours, or about 6 hours to about 24 hours, or about 12 hours to about 48 hours).

The N-alkylation in Scheme 3 may be performed in a solvent that includes, but is not limited to, DMSO, benzylalcohol, nitrobenzene, nitroalcohol, and the like, and any combination thereof.

The molar ratio of the halogen-terminal alkyl-optical absorber to the polyamide is preferably about 500:1 to about 10:1 (or about 500:1 to about 100:1, or about 250:1 to about 50:1, or about 100:1 to about 10:1).

The product of Scheme 3 is a polyamide having an optical absorber pendent from a backbone of the polyamide, wherein the polyamide and the optical absorber are connected by an alkyl linker preferably having 2-18 carbons, more preferably 2-6 carbons. One skilled in the art will recognize that Schemes 1, 2, and 3 can be adapted to other optical absorbers and other polyamides to yield various OAMB-polyamides. Compounds 1-7 are nonlimiting examples of OAMB-polyamides.

Compound 1

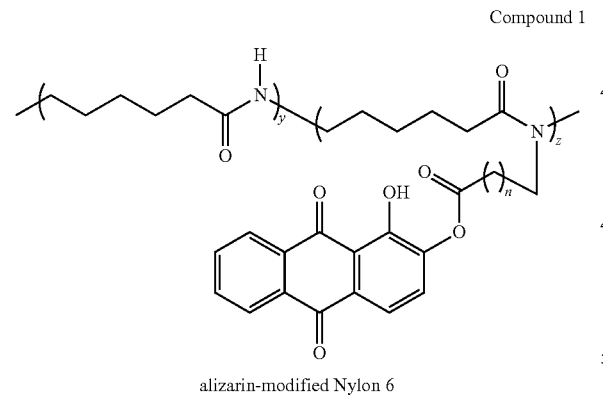

alizarin-modified Nylon 6

Compound 2

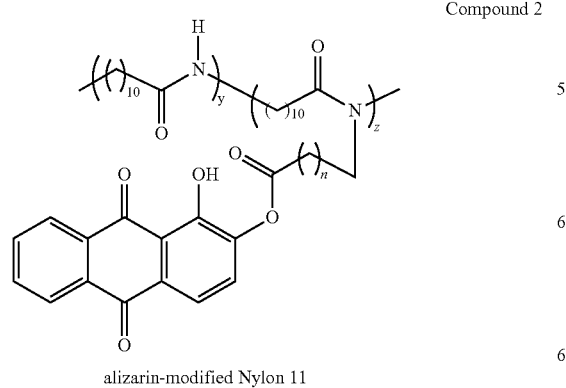

alizarin-modified Nylon 11

Compound 3

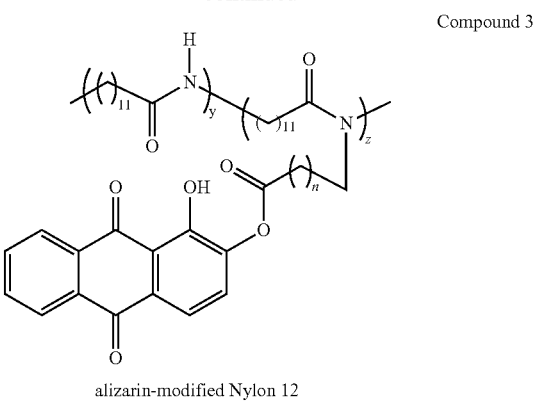

alizarin-modified Nylon 12

Compound 4

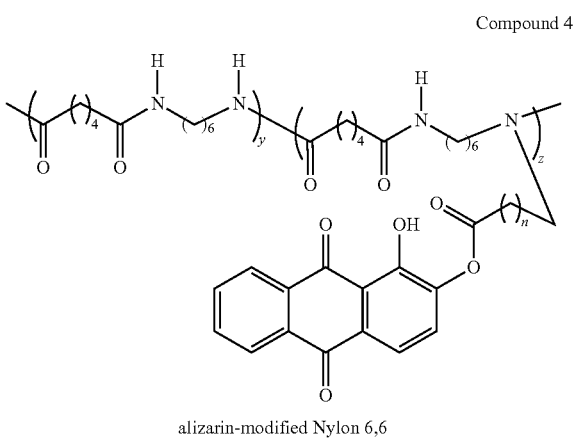

alizarin-modified Nylon 6,6

Compound 5

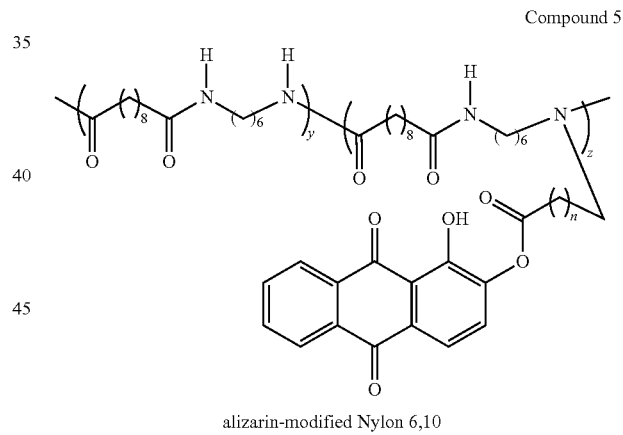

alizarin-modified Nylon 6,10

Compound 6

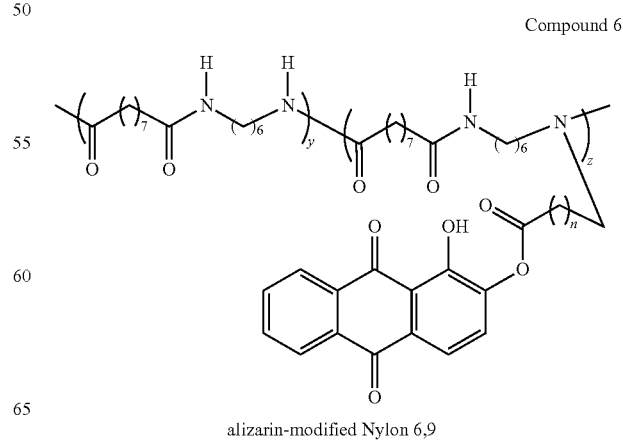

alizarin-modified Nylon 6,9

-continued

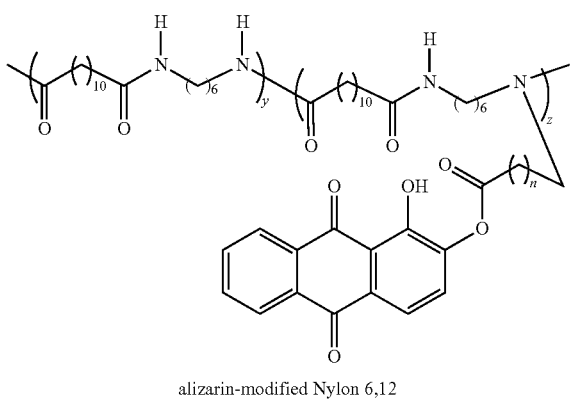

Compound 7 alizarin-modified Nylon 6,12

Applications of OAMB-Polyamides

The OAMB-polyamides described herein may be used to produce a variety of objects (or articles). The OAMB-polyamides described herein may be used alone or in combination with other thermoplastic polymers (e.g., polyamides without an optical absorber and/or other thermoplastic polymers). Examples of thermoplastic polymers that may be used in conjunction with one or more OAMB-polyamides of the present disclosure include, but are not limited to, polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly (methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the methods and systems described herein.

If needed, compatibilizers may be used when combining the OAMB-polyamides described herein with other thermoplastic polymers. Compatibilizers may improve the blending efficiency and/or efficacy of the polymers. Examples of polymer compatibilizers include, but are not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like, and any combination thereof.

Methods for producing objects include, but are not limited to, melt extrusion, injection molding, compression molding, melt spinning, melt emulsification, spray drying (e.g., to form particles), cryogenic milling (or cryogenic grinding), freeze drying polymer dispersions, precipitation of polymer dispersions, and the like, and any hybrid thereof.

Examples of articles that may be produced by such methods where the OAMB-polyamide may be all or a portion of said articles include, but are not limited to, particles, films, packaging, toys, household goods, automotive parts, aerospace/aircraft-related parts, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3-D anatomy models to aid in surgeries, robotics, biomedical devices (orthotics), home appliances, dentistry, electronics, sporting goods, and the like. Further, particles may be useful in applications that include, but are not limited to, paints, powder coatings, ink jet materials, electrophotographic toners, 3-D printing, and the like.

The OAMB-polyamides described herein may have a specific chemical fingerprint that is useful in identifying objects, tracking objects, authenticating objects, and/or determining the health of objects. Further, the placement of where the OAMB-polyamides are located in the objects is used as another layer of fingerprinting the objects for identifying objects, tracking objects, authenticating objects, and/or determining the health of objects.

Methods of identifying objects, tracking objects, authenticating objects, and/or determining the health of objects may include (a) exposing the object comprising OAMB-polyamides to electromagnetic radiation (e.g., for fluorophores preferably at a wavelength of 302 nm or less or 700 nm or greater); (b) sensing one or more spectra related to the electromagnetic radiation absorbed and/or reemitted (e.g., for fluorophores preferably the photoluminescence emitted between 302 nm to 700 nm); and (c) comparing the spectra to the known spectra for the optical absorbers used in said object or a portion thereof. Optionally, the location of where the spectra area is located on the object may be compared to the known location where the spectra area should be. The comparison(s) can be used for identifying and/or authenticating the object. For tracking, the comparison(s) may be done and/or the detected spectra and/or spectra area may be logged into a database along with the physical location of the object. Further, the health of objects that wear and/or crack can be ascertained. For example, a core portion of the article may comprise optical absorbers and an outer portion may cover the core portion and not comprise the optical absorbers (or comprise different optical absorbers). Then, when comparing spectra, the appearance of spectral features for the optical absorbers in the core may indicate that the object is at or near the end of life.

By way of nonlimiting example, 3-D printing processes of the present disclosure may comprise: depositing particles comprising one or more OAMB-polyamides of the present disclosure (and optionally one or more other thermoplastic polymers and/or one or more compatibilizers) upon a surface in a specified shape, and once deposited, heating at least a portion of the particles to promote consolidation thereof and form a consolidated body (object), such that the consolidated body has a void percentage of about 1% or less after being consolidated. For example, heating and consolidation of the thermoplastic polymer particles may take place in a 3-D printing apparatus employing a laser, such that heating and consolidation take place by selective laser sintering.

By way of nonlimiting example, 3-D printing processes of the present disclosure may comprise: extruding a filament comprising one or more OAMB-polyamides of the present disclosure (and optionally one or more other thermoplastic polymers and/or one or more compatibilizers) through an orifice, wherein the filament becomes a polymer melt upon extrusion; depositing the polymer melt as a first layer on a platform; cooling the layer; depositing an additional layer of the polymer melt on the first layer; cooling the additional layer; repeating depositing and cooling for at least one additional layer to produce a 3-D shape.

Yet another nonlimiting example is a method comprising: extruding a polymer melt comprising one or more OAMB-polyamides of the present disclosure (and optionally one or more other thermoplastic polymers and/or one or more compatibilizers) through an orifice to produce a film, a fiber (or a filament), particles, pellets, or the like.

Thermoplastic Polymer Particles and Methods of Making

The FIGURE a flow chart of a nonlimiting example method 100 of the present disclosure. Thermoplastic polymer 102 (comprising one or more OAMB-polyamides and optionally one or more other thermoplastic polymers), carrier fluid 104, and optionally emulsion stabilizer 106 are combined 108 to produce a mixture 110. The components 102, 104, and 106 can be added in any order and include mixing and/or heating during the process of combining 108 the components 102, 104, and 106.

The mixture 110 is then processed 112 by applying sufficiently high shear to the mixture 110 at a temperature greater than the melting point or softening temperature of the thermoplastic polymer 102 to form a melt emulsion 114. Because the temperature is above the melting point or softening temperature of the thermoplastic polymer 102, the thermoplastic polymer 102 becomes a polymer melt. The shear rate should be sufficient enough to disperse the polymer melt in the carrier fluid 104 as droplets (i.e., the polymer emulsion 114). Without being limited by theory, it is believed that, all other factors being the same, increasing shear should decrease the size of the droplets of the polymer melt in the carrier fluid 104. However, at some point there may be diminishing returns on increasing shear and decreasing droplet size or may be disruptions to the droplet contents that decrease the quality of particles produced therefrom.

The melt emulsion 114 inside and/or outside the mixing vessel is then cooled 116 to solidify the polymer droplets into thermoplastic polymer particles (also referred to as solidified thermoplastic polymer particles). The cooled mixture 118 can then be treated 120 to isolate the thermoplastic polymer particles 122 from other components 124 (e.g., the carrier fluid 104, excess emulsion stabilizer 106, and the like) and wash or otherwise purify the thermoplastic polymer particles 122. The thermoplastic polymer particles 122 comprise the thermoplastic polymer 102 and, when included, at least a portion of the emulsion stabilizer 106 coating the outer surface of the thermoplastic polymer particles 122. Emulsion stabilizers 106, or a portion thereof, may be deposited as a uniform coating on the thermoplastic polymer particles 122. In some instances, which may be dependent upon non-limiting factors such as the temperature (including cooling rate), the type of thermoplastic polymer 102, and the types and sizes of emulsion stabilizers 106, the nanoparticles of emulsion stabilizers 106 may become at least partially embedded within the outer surface of thermoplastic polymer particles 122 in the course of becoming associated therewith. Even without embedment taking place, at least the nanoparticles within emulsion stabilizers 106 may remain robustly associated with thermoplastic polymer particles 122 to facilitate their further use. In contrast, dry blending already formed thermoplastic polymer particulates (e.g., formed by cryogenic grinding or precipitation processes) with a flow aid like silica nanoparticles does not result in a robust, uniform coating of the flow aid upon the thermoplastic polymer particulates.

Advantageously, carrier fluids and washing solvents of the systems and methods described herein (e.g., method 100) can be recycled and reused. One skilled in the art will recognize any necessary cleaning of used carrier fluid and solvent necessary in the recycling process.

The thermoplastic polymer 102 and carrier fluid 104 should be chosen such that at the various processing temperatures (e.g., from room temperature to process temperature) the thermoplastic polymer 102 and carrier fluid 104 are immiscible. An additional factor that may be considered is the differences in (e.g., a difference or a ratio of) viscosity at process temperature between the molten polyamide 102 and the carrier fluid 104. The differences in viscosity may affect droplet breakup and particle size distribution. Without being limited by theory, it is believed that when the viscosities of the molten polyamide 102 and the carrier fluid 104 are too similar, the circularity of the product as a whole may be reduced where the particles are more ovular and more elongated structures are observed.

The thermoplastic polymers 102 comprises one or more OAMB-polyamides and optionally one or more other thermoplastic polymers. Examples of other thermoplastic polymers include, but are not limited to, polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the methods and systems of the present disclosure.

The other thermoplastic polymers in the compositions and methods of the present disclosure may be elastomeric or non-elastomeric. Some of the foregoing examples of other thermoplastic polymers may be elastomeric or non-elastomeric depending on the exact composition of the polymer. For example, polyethylene that is a copolymer of ethylene and propylene may be elastomeric or not depending on the amount of propylene in the polymer.

Thermoplastic elastomers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in the "Handbook of Thermoplastic Elastomers," 2nd ed., B. M. Walker and C. P. Rader, eds., Van Nostrand Reinhold, N.Y., 1988.

Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylenepropylene), poly(styrene-butadiene-styrene), poly(styrene-butylene-butadiene-styrene), and the like, and any combination thereof.

Examples of polyamides include, but are not limited to, polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof. Copolyamides may also be used. Examples of copolyamides include, but are not limited to, PA 11/10.10, PA 6/11, PA 6.6/6, PA 11/12, PA 10.10/10.12, PA 10.10/10.14, PA 11/10.36, PA 11/6.36, PA 10.10/10.36, and the like, and any combination thereof. Examples of polyamide elastomers include, but are not limited to, polyesteramide, polyetheresteramide, polycarbonate-esteramide, and polyether-block-amide elastomers.

Examples of polyurethanes include, but are not limited to, polyether polyurethanes, polyester polyurethanes, mixed polyether and polyester polyurethanes, and the like, and any combination thereof. Examples of thermoplastic polyurethanes include, but are not limited to, poly[4,4'-methylenebis(phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

Compatibilizers may optionally be used to improve the blending efficiency and efficacy OAMB-polyamides with one or more thermoplastic polymers. Examples of polymer compatibilizers include, but not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like, and any combination thereof.

The thermoplastic polymers 102 (comprising one or more OAMB-polyamides and optionally one or more other thermoplastic polymers) may have a melting point or softening temperature of about 50° C. to about 450° C. (or about 50° C. to about 125° C., or about 100° C. to about 175° C., or about 150° C. to about 280° C., or about 200° C. to about 350° C., or about 300° C. to about 450° C.).

The thermoplastic polymers 102 may have a glass transition temperature (ASTM E1356-08(2014) with 10° C./min. ramping and cooling rates) of about −50° C. to about 400° C. (or about −50° C. to about 0° C., or about −25° C. to about 50° C., or about 0° C. to about 150° C., or about 100° C. to about 250° C., or about 150° C. to about 300° C., or about 200° C. to about 400° C.).

The thermoplastic polymers 102 may optionally comprise an additive. Typically, the additive would be present before addition of the thermoplastic polymers 102 to the mixture 110. Therefore, in the thermoplastic polymer melt droplets and resultant thermoplastic polymer particles, the additive is dispersed throughout the thermoplastic polymer. Accordingly, for clarity, this additive is referred to herein as an "internal additive." The internal additive may be blended with the thermoplastic polymer just prior to making the mixture 110 or well in advance.

When describing component amounts in the compositions described herein (e.g., the mixture 110 and thermoplastic polymer particles 122), a weight percent based on the thermoplastic polymer 102 not inclusive of the internal additive. For example, a composition comprising 1 wt % of emulsion stabilizer by weight of 100 g of a thermoplastic polymer 102 comprising 10 wt % internal additive and 90 wt % thermoplastic polymer is a composition comprising 0.9 g of emulsion stabilizer, 90 g of thermoplastic polymer, and 10 g of internal additive.

The internal additive may be present in the thermoplastic polymer 102 at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the thermoplastic polymer 102. For example, the thermoplastic polymer 102 may comprise about 70 wt % to about 85 wt % of a thermoplastic polymer and about 15 wt % to about 30 wt % of an internal additive like glass fiber or carbon fiber.

Examples of internal additives include, but are not limited to, fillers, strengtheners, pigments, pH regulators, and the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), and the like, and any combination thereof. Examples of pigments include, but are not limited to, organic pigments, inorganic pigments, carbon black, and the like, and any combination thereof.

The thermoplastic polymer 102 may be present in the mixture 110 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the thermoplastic polymer 102 and carrier fluid 104 combined.

Suitable carrier fluids 104 have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt).

Examples of carrier fluids 104 include, but are not limited to, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. When the carrier fluid 104 comprises two or more of the foregoing, the carrier fluid 104 may have one or more phases. For example, polysiloxanes modified with fatty acids and polysiloxanes modified with fatty alcohols (preferably with similar chain lengths for the fatty acids and fatty alcohols) may form a single-phase carrier fluid 104. In another example, a carrier fluid 104 comprising a silicone oil and an alkyl-terminal polyethylene glycol may form a two-phase carrier fluid 104.

The carrier fluid 104 may be present in the mixture 110 at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the thermoplastic polymer 102 and carrier fluid 104 combined.

In some instances, the carrier fluid 104 may have a density of about 0.6 g/cm$^3$ to about 1.5 g/cm$^3$, and the thermoplastic polymer 102 has a density of about 0.7 g/cm$^3$ to about 1.7 g/cm$^3$, wherein the thermoplastic polymer has a density similar, lower, or higher than the density of the carrier fluid.

The emulsion stabilizers used in the methods and compositions of the present disclosure may comprise nanoparticles (e.g. oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 m$^2$/g), AEROSIL® RX50 (about 40 nm average diameter silica nanoparticles having a hydrophobically modified surface and a BET surface area of 35±10 m$^2$/g), AEROSIL® 380 (silica nanoparticles having a hydrophilically modified surface and a BET surface area of 380±30 m$^2$/g), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

The nanoparticles may have an average diameter (D50 based on volume) of about 1 nm to about 500 nm (or about 10 nm to about 150 nm, or about 25 nm to about 100 nm, or about 100 nm to about 250 nm, or about 250 nm to about 500 nm).

The nanoparticles may have a BET surface area of about 10 m$^2$/g to about 500 m$^2$/g (or about 10 m$^2$/g to about 150 m$^2$/g, or about 25 m$^2$/g to about 100 m$^2$/g, or about 100 m$^2$/g to about 250 m$^2$/g, or about 250 m$^2$/g to about 500 m$^2$/g).

Nanoparticles may be included in the mixture 110 at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the thermoplastic polymer 102.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxyethoxy)ethoxy)propylmethylsiloxane], docusate sodium (sodium 1,4-bis(2-ethylhexoxy)-1,4-dioxobutane-2-sulfonate), and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITONT™ X-100 (octyl phenol ethoxylate, available from Sigma Aldrich), IGEPAL® CA-520 (polyoxyethylene (5) isooctylphenyl ether, available from Sigma Aldrich), BRIJ® S10 (polyethylene glycol octadecyl ether, available from Sigma Aldrich), and the like, and any combination thereof.

Surfactants may be included in the mixture 110 at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the polyamide 102. Alternatively, the mixture 110 may comprise no (or be absent of) surfactant.

A weight ratio of nanoparticles to surfactant may be about 1:10 to about 10:1 (or about 1:10 to about 1:1, or about 1:5 to about 5:1, or about 1:1 to about 10:1).

As described above, the components 102, 104, and 106 can be added in any order and include mixing and/or heating during the process of combining 108 the components 102, 104, and 106. For example, the emulsion stabilizer 106 may first be dispersed in the carrier fluid 104, optionally with heating said dispersion, before adding the thermoplastic polymer 102. In another nonlimiting example, the thermoplastic polymer 102 may be heated to produce a polymer melt to which the carrier fluid 104 and emulsion stabilizer 106 are added together or in either order. In yet another nonlimiting example, the thermoplastic polymer 102 and carrier fluid 104 can be mixed at a temperature greater than the melting point or softening temperature of the thermoplastic polymer 102 and at a shear rate sufficient enough to disperse the thermoplastic polymer melt in the carrier fluid 104. Then, the emulsion stabilizer 106 can be added to form the mixture 110 and maintained at suitable process conditions for a set period of time.

Combining 108 the components 102, 104, and 106 in any combination can occur in a mixing apparatus used for the processing 112 and/or another suitable vessel. By way of nonlimiting example, the thermoplastic polymer 102 may be heated to a temperature greater than the melting point or softening temperature of the thermoplastic polymer 102 in the mixing apparatus used for the processing 112, and the emulsion stabilizer 106 may be dispersed in the carrier fluid 104 in another vessel. Then, said dispersion may be added to the melt of the thermoplastic polymer 102 in the mixing apparatus used for the processing 112.

The mixing apparatuses used for the processing 112 to produce the melt emulsion 114 should be capable of maintaining the melt emulsion 114 at a temperature greater than the melting point or softening temperature of the thermoplastic polymer 102 and applying a shear rate sufficient to disperse the polymer melt in the carrier fluid 104 as droplets.

Examples of mixing apparatuses used for the processing 112 to produce the melt emulsion 114 include, but are not limited to, extruders (e.g., continuous extruders, batch extruders, and the like), stirred reactors, blenders, reactors with inline homogenizer systems, and the like, and apparatuses derived therefrom.

Processing 112 and forming the melt emulsion 114 at suitable process conditions (e.g., temperature, shear rate, and the like) for a set period of time.

The temperature of processing 112 and forming the melt emulsion 114 should be a temperature greater than the melting point or softening temperature of the thermoplastic polymer 102 and less than the decomposition temperature of any components 102, 104, and 106 in the mixture 110. For example, the temperature of processing 112 and forming the melt emulsion 114 may be about 1° C. to about 50° C. (or about 1° C. to about 25° C., or about 5° C. to about 30° C., or about 20° C. to about 50° C.) greater than the melting point or softening temperature of the thermoplastic polymer 102 provided the temperature of processing 112 and forming the melt emulsion 114 is less than the decomposition temperature of any components 102, 104, and 106 in the mixture 110.

The shear rate of processing 112 and forming the melt emulsion 114 should be sufficiently high to disperse the polymer melt in the carrier fluid 104 as droplets. Said droplets should comprise droplets having a diameter of about 1,000 µm or less (or about 1 µm to about 1,000 µm, or about 1 µm to about 50 µm, or about 10 µm to about 100 µm, or about 10 µm to about 250 µm, or about 50 µm to about 500 µm, or about 250 µm to about 750 µm, or about 500 µm to about 1,000 µm).

The time for maintaining said temperature and shear rate for processing 112 and forming the melt emulsion 114 may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing 112 can be stopped. That time may depend on, among other things, the temperature, shear rate, thermoplastic polymer 102 composition, the carrier fluid 104 composition, and the emulsion stabilizer 106 composition.

The melt emulsion 114 may then be cooled 116. Cooling 116 can be slow (e.g., allowing the melt emulsion to cool under ambient conditions) to fast (e.g., quenching). For example, the rate of cooling may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion 114. In some instances, the shear applied during heating may be applied during cooling.

The cooled mixture 118 resulting from cooling 116 the melt emulsion 114 comprises solidified thermoplastic polymer particles 122 (or simply thermoplastic polymer particles) and other components 124 (e.g., the carrier fluid 104, excess emulsion stabilizer 106, and the like). The thermoplastic polymer particles may be dispersed in the carrier fluid or settled in the carrier fluid.

The cooled mixture 118 may then be treated 120 to the separate thermoplastic polymer particles 122 (or simply thermoplastic polymer particles 122) from the other components 124. Suitable treatments include, but are not limited to, washing, filtering, centrifuging, decanting, and the like, and any combination thereof.

Solvents used for washing the thermoplastic polymer particles 122 should generally be (a) miscible with the carrier fluid 104 and (b) nonreactive (e.g., non-swelling and non-dissolving) with the thermoplastic polymer 102. The choice of solvent will depend on, among other things, the composition of the carrier fluid and the composition of the thermoplastic polymer 102.

Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, and the like, and any combination thereof.

Solvent may be removed from the thermoplastic polymer particles 122 by drying using an appropriate method such as air drying, heat drying, reduced pressure drying, freeze drying, or a hybrid thereof. The heating may be performed preferably at a temperature lower than the glass transition point of the thermoplastic polymer (e.g., about 50° C. to about 150° C.).

The thermoplastic polymer particles 122 after separation from the other components 124 may optionally be further classified to produce purified thermoplastic polymer particles 128. For example, to narrow the particle size distribution (or reduce the diameter span), the thermoplastic polymer particles 122 can be passed through a sieve having a pore size of about 10 µm to about 250 µm (or about 10 µm to about 100 µm, or about 50 µm to about 200 µm, or about 150 µm to about 250 µm).

In another example of purification technique, the thermoplastic polymer particles 122 may be washed with water to remove surfactant while maintaining substantially all of the nanoparticles associated with the surface of the thermoplastic polymer particles 122. In yet another example of purification technique, the thermoplastic polymer particles 122 may be blended with additives to achieve a desired final product. For clarity, because such additives are blended with the thermoplastic particles 122 or other particles resultant from the methods described herein after the particles are solidified, such additives are referred to herein as "external additives." Examples of external additives include flow aids, other polymer particles, fillers, and the like, and any combination thereof.

In some instances, a surfactant used in making the thermoplastic polymer particles 122 may be unwanted in downstream applications. Accordingly, yet another example of purification technique may include at least substantial removal of the surfactant from the thermoplastic polymer particles 122 (e.g., by washing and/or pyrolysis).

The thermoplastic polymer particles 122 and/or purified thermoplastic polymer particles 128 (referred to as particles 122/128) may be characterized by composition, physical structure, and the like.

As described above, the emulsion stabilizers are at the interface between the polymer melt and the carrier fluid. As a result, when the mixture is cooled, the emulsion stabilizers remain at, or in the vicinity of, said interface. Therefore, the structure of the particles 122/128, in general, includes emulsion stabilizers (a) dispersed on an outer surface of the particles 122/128 and/or (b) embedded in an outer portion (e.g., outer 1 vol %) of the particles 122/128.

Further, where voids form inside the polymer melt droplets, emulsion stabilizers 106 should generally be at (and/or embedded in) the interface between the interior of the void and the thermoplastic polymer. The voids generally do not contain the thermoplastic polymer. Rather, the voids may contain, for example, carrier fluid, air, or be void. The particles 122/128 may comprise carrier fluid at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the particles 122/128.

The thermoplastic polymer 102 may be present in the particles 122/128 at about 90 wt % to about 99.5 wt % (or about 90 wt % to about 95 wt %, or about 92 wt % to about 97 wt %, or about 95 wt % to about 99.5 wt %) of the particles 122/128.

When included, the emulsion stabilizers 106 may be present in the particles 122/128 at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the particles 122/128. When purified to at least substantially remove surfactant or another emulsion stabilizer, the emulsion stabilizers 106 may be present in the particles 128 at less than 0.01 wt % (or 0 wt % to about 0.01 wt %, or 0 wt % to 0.001 wt %).

Upon forming thermoplastic particulates according to the disclosure herein, at least a portion of the nanoparticles, such as silica nanoparticles, may be disposed as a coating upon the outer surface of the thermoplastic particulates. At least a portion of the surfactant, if used, may be associated with the outer surface as well. The coating may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 122/128. When purified to at least substantially remove surfactant or another emulsion stabilizer, the emulsion stabilizers 106 may be present in the particles 128 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 128. The coverage of the emulsion stabilizers 106 on an outer surface of the particles 122/128 may be determined using image analysis of the scanning electron microscope images (SEM micrographs). The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the particles 122/128. When purified to at least substantially remove surfactant or another emulsion stabilizer, the emulsion stabilizers 106 may be present in the particles 128 at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the particles 128. The coverage of the emulsion stabilizers 106 on an outer surface of the particles 122/128 may be determined using image analysis of the SEM micrographs The particles 122/128 may have a D10 of about 0.1 μm to about 125 μm (or about 0.1 μm to about 5 μm, about 1 μm to about 10 μm, about 5 μm to about 30 μm, or about 1 μm to about 25 μm, or about 25 μm to about 75 μm, or about 50 μm to about 85 μm, or about 75 μm to about 125 μm), a D50 of about 0.5 μm to about 200 μm (or about 0.5 μm to about 10 μm, or about 5 μm to about 50 μm, or about 30 μm to about 100 μm, or about 30 μm to about 70 μm, or about 25 μm to about 50 μm, or about 50 μm to about 100 μm, or about 75 μm to about 150 μm, or about 100 μm to about 200 μm), and a D90 of about 3 μm to about 300 μm (or about 3 μm to about 15 μm, or about 10 μm to about 50 μm, or about 25 μm to about 75 μm, or about 70 μm to about 200 μm, or about 60 μm to about 150 μm, or about 150 μm to about 300 μm), wherein D10<D50<D90. The particles 122/128 may also have a diameter span of about 0.4 to about 3 (or about 0.6 to about 2, or about 0.4 to about 1.5, or about 1 to about 3). Without limitation, diameter span values of 1.0 or greater are considered broad, and diameter span values of 0.75 or less are considered narrow. For example, the particles 122/128 may have a D10 of about 5 μm to about 30 μm, a D50 of about 30 μm to about 100 μm, and a D90 of about 70 μm to about 120 μm, wherein D10<D50<D90.

The particles 122/128 may also have a diameter span of about 0.4 to about 3 (or about 0.6 to about 2, or about 0.4 to about 1.5, or about 1 to about 3).

In a first nonlimiting example, the particles 122/128 may have a D10 of about 0.5 μm to about 5 μm, a D50 of about 0.5 μm to about 10 μm, and a D90 of about 3 μm to about 15 μm, wherein D10<D50<D90.

In a second nonlimiting example, the particles 122/128 may have a D10 of about 1 μm to about 50 μm, a D50 of about 25 μm to about 100 μm, and a D90 of about 60 μm to about 300 μm, wherein D10<D50<D90.

In a third nonlimiting example, the particles 122/128 may have a D10 of about 5 μm to about 30 μm, a D50 of about 30 μm to about 70 μm, and a D90 of about 70 μm to about 120 μm, wherein D10<D50<D90. Said particles 122/128 may have a diameter span of about 1.0 to about 2.5.

In a fourth nonlimiting example, the particles 122/128 may have a D10 of about 25 μm to about 60 μm, a D50 of about 60 μm to about 110 μm, and a D90 of about 110 μm to about 175 μm, wherein D10<D50<D90. Said particles 122/128 may have a diameter span of about 0.6 to about 1.5.

In a fifth nonlimiting example, the particles 122/128 may have a D10 of about 75 μm to about 125 μm, a D50 of about 100 μm to about 200 μm, and a D90 of about 125 μm to about 300 μm, wherein D10<D50<D90. Said particles 122/128 may have a diameter span of about 0.2 to about 1.2.

The particles 122/128 may have a circularity of about 0.7 or greater (or about 0.90 to about 1.0, or about 0.93 to about 0.99, or about 0.95 to about 0.99, or about 0.97 to about 0.99, or about 0.98 to 1.0).

The particles 122/128 may have an angle of repose of about 250 to about 45 (or about 250 to about 35°, or about 300 to about 40°, or about 35 to about 45°).

The particles 122/128 may have a Hausner ratio of about 1.0 to about 1.5 (or about 1.0 to about 1.2, or about 1.1 to about 1.3, or about 1.2 to about 1.35, or about 1.3 to about 1.5).

The particles 122/128 may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

Depending on the temperature and shear rate of processing 112 and the composition and relative concentrations of the components 102, 104, and 106, different shapes of the structures that compose the particles 122/128 have been observed. Typically, the particles 122/128 comprise substantially of spherical particles (having a circularity of about 0.97 or greater). However, other structures that included disc and elongated structures have been observed in the particles 122/128. Therefore, the particles 122/128 may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The particles 122/128 may have a sintering window that is within 10° C., preferably within 5° C., of the sintering window of the thermoplastic polymer 102 (comprising one or more OAMB-polyamides and optionally one or more other thermoplastic polymers).

Applications of OAMB-Polyamide Particles

The OAMB-polyamide particles described herein may be used to produce a variety of objects (or articles). The OAMB-polyamides described herein may be used alone or in combination with other particles comprising other thermoplastic polymers (e.g., polyamides without an optical absorber and/or other thermoplastic polymers). Examples of thermoplastic polymers that may be used in such other particles include, but are not limited to, polyamides, polyurethanes, polyethylenes, polypropylenes, polyacetals, polycarbonates, polybutylene terephthalate (PBT), polyethylene terephthalate (PET), polyethylene naphthalate (PEN), polytrimethylene terephthalate (PTT), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyolefins, functionalized or nonfunctionalized ethylene/vinyl monomer polymer, functionalized or nonfunctionalized ethylene/alkyl (meth) acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF), phenolic resins, poly(ethylene/vinyl acetate)s, polybutadienes, polyisoprenes, styrenic block copolymers, polyacrylonitriles, silicones, and the like, and any combination thereof. Copolymers comprising one or more of the foregoing may also be used in the methods and systems described herein.

The OAMB-polyamide particles may be useful in applications that include, but are not limited to, paints, powder coatings, ink jet materials, electrophotographic toners, 3-D printing, and the like.

By way of nonlimiting example, 3-D printing processes of the present disclosure may comprise: depositing OAMB-polyamide particles in the present disclosure (and optionally one or more other thermoplastic polymers and/or one or more compatibilizers) optionally in combination with other particles comprising one or more thermoplastic polymers and/or one or more compatibilizers upon a surface in a specified shape, and once deposited, heating at least a portion of the particles to promote consolidation thereof and form a consolidated body (or object or article), such that the consolidated body has a void percentage of about 1% or less after being consolidated. For example, heating and consolidation of the thermoplastic polymer particles may take place in a 3-D printing apparatus employing a laser, such that heating and consolidation take place by selective laser sintering.

Examples of articles that may be produced by such methods where the OAMB-polyamide may be all or a portion of said articles include, but are not limited to, particles, films, packaging, toys, household goods, automotive parts, aerospace/aircraft-related parts, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3-D anatomy models to aid in surgeries, robotics, biomedical devices (orthotics), home appliances, dentistry, electronics, sporting goods, and the like.

The OAMB-polyamides described herein may have a specific chemical fingerprint that is useful in identifying objects, tracking objects, authenticating objects, and/or determining the health of objects. Further, the placement of where the OAMB-polyamides are located in the objects is another layer of fingerprinting the objects for identifying objects, tracking objects, authenticating objects, and/or determining the health of objects.

Methods of identifying objects, tracking objects, authenticating objects, and/or determining the health of objects may include (a) exposing the object comprising OAMB-polyamides to electromagnetic radiation (e.g., for fluorophores preferably at a wavelength of 302 nm or less or 700 nm or greater); (b) sensing one or more spectra related to the electromagnetic radiation absorbed and/or reemitted (e.g., for fluorophores preferably the photoluminescence emitted between 302 nm to 700 nm); and (c) comparing the spectra to the known spectra for the optical absorbers used in said object or portion thereof. Optionally, the location of where the spectra area is located on the object may be compared to the known location where the spectra area should be. The comparison(s) can be used for identifying and/or authenticating the object. For tracking, the comparison(s) may be done and/or the detected spectra and/or spectra area may be logged into a database along with the physical location of the object. Further, the health of objects that wear and/or crack can be ascertained. For example, a core portion of the article may comprise optical absorbers and an outer portion may cover the core portion and not comprise the optical absorbers (or comprise different optical absorbers). Then, when comparing spectra, the appearance of spectral features for the optical absorbers in the core may indicate that the object is at or near the end of life.

Example Embodiments

A first nonlimiting example embodiment is a method comprising: esterifying a hydroxyl-pendent optical absorber with a halogen-terminal aliphatic acid to yield a halogen-terminal alkyl-optical absorber; and N-alkylating a polyamide with the halogen-terminal alkyl-optical absorber to yield a polyamide having an optical absorber pendent from the polyamide's backbone (OAMB-polyamide). The first nonlimiting example embodiment may include one or more of: Element 1: wherein the halogen-terminal aliphatic acid is a chloro aliphatic acid or a bromo aliphatic acid; Element 2: wherein the halogen-terminal aliphatic acid is a $C_2$ to $C_{18}$ halogen-terminal aliphatic acid; Element 3: wherein the hydroxyl-pendent optical absorber is selected from the group consisting of: 1,2-dihydroxyanthraquinone; carminic acid; 1,3-dihydroxyanthraquinone; 1,4-dihydroxyanthraquinone; 1-hydroxy-4-(p-tolylamino)anthraquinone; 1,8-dihydroxy-3-methoxy-6-methylanthraquinone; 1,2,5-trihydroxy-6-methylanthracene-9,10-dione; calcein; 6-carboxyfluorescein succinimidyl ester; 6-carboxyfluorescein; 2',7'-dichloro-3',6'-dihydroxy-3H-spiro[2-benzofuran-1,9'-xanthen]-3-one; fluorescein isothiocyanate; 4',5'-dibromofluorescein; 5(6)-carboxy-2',7'-dichlorofluorescein; 4-chloro-3-[(2Z)-2-[1-[5-chloro-4-[[(2Z)-2-[[2-chloro-5-[N-[2-(4-chlorophenoxy)-5-(trifluoromethyl)phenyl]-C-hydroxycarbonimidoyl]phenyl]hydrazinylidene]-3-oxobutanoyl]amino]-2-methylanilino]-1,3-dioxobutan-2-ylidene]hydrazinyl]-N-[2-(4-chlorophenoxy)-5-(trifluoromethyl)phenyl]benzenecarboximidic acid; 2-[(3-carboxy-2-oxidonaphthalen-1-yl)diazenyl]-4-chloro-5-methylbenzenesulfonate disodium; phenol dyes; 3,3-bis(4-hydroxyphenyl)-2-benzofuran-1-one; 4,8-diamino-1,5-dihydroxy-9,10-dioxoanthracene-2-sulfonate sodium; 1-amino-4-hydroxy-2-phenoxyanthracene-9,10-dione; 5-oxo-1-(4-sulfonatophenyl)-4-[(4-sulfonatophenyl)diazenyl]-4H-pyrazole-3-carboxylate trisodium; 5-chloro-2-hydroxy-3-[(3-methyl-5-oxo-1-phenyl-4H-pyrazol-4-yl)diazenyl]benzenesulfonate sodium; 2-[(4-hydroxy-9,10-dioxoanthracen-1-yl)amino]-5-methylbenzenesulfonic acid; 3,5,6,8-tetrahydroxy-1-methyl-9,10-dioxo-7-[3,4,5-trihydroxy-6-(hydroxymethyl)oxan-2-yl]anthracene-2-carboxylic acid; and the like; and any combination thereof; Element 4: wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof; Element 5: wherein the halogen-terminal aliphatic acid is $X-(CH_2)_n-COOH$ where X is bromo or chloro and n is 1-17; Element 6: wherein the halogen-terminal aliphatic acid is selected from the group consisting of: bromoacetic acid, chloroacetic acid, 3-bromopropionic acid, 3-chloropropionic acid, 4-bromobutyric acid, 4-chlorobutyric acid, 5-bromovaleric acid, 5-chlorovaleric acid, 6-bromohexanoic acid, 6-chlorohexanoic acid, and any combination thereof; Element 7: wherein esterifying is at about 0° C. to about 70° C.; Element 8: wherein esterifying is for about 10 minutes to about 24 hours; Element 9: wherein a molar ratio of the hydroxyl-pendent optical absorber to the halogen-terminal aliphatic acid is about 5:1 to about 1:5; Element 10: wherein the N-alkylating is at about 100° C. to about 200° C.; Element 11: wherein the N-alkylating is for about 10 minutes to about 48 hours; Element 12: wherein a molar ratio of the halogen-terminal alkyl-optical absorber to the polyamide is preferably about 500:1 to about 10:1. Examples of combinations include, but are not limited to, Element 1 in combination with one or more of Elements 2-12; Element 2 in combination with one or more of Elements 3-12; Element 3 in combination with one or more of Elements 4-12; Element 4 in combination with one or more of Elements 5-12; Element 5 in combination with one or more of Elements 6-12; Element 6 in combination with one or more of Elements 7-12; Element 7 in combination with one or more of Elements 8-12; Element 8 in combination with one or more of Elements 9-12; Element 9 in combination with one or more of Elements 10-12; Element 10 in combination with one or more of Elements 11-12; and Elements 11 and 12 in combination.

A second nonlimiting example embodiment is a method comprising: esterifying a carboxyl-pendent optical absorber with a halogen-terminal aliphatic alcohol to yield a halogen-terminal alkyl-optical absorber; and N-alkylating a polyamide with the modified optical absorber to yield a polyamide having an optical absorber pendent from the polyamide's backbone (OAMB-polyamide). The second nonlimiting example embodiment may include one or more of: Element 13: wherein the carboxyl-pendent optical absorber is selected from the group consisting of: calcein; 5(6)-carboxyfluorescein; 6-carboxyfluorescein; 5(6)-carboxyfluorescein-N-hydroxysuccinimide ester; 2-pyrenepropanoic acid; 2-perylenepropanoic acid; 3,9-perylenedicarboxylic acid; 5(6)-carboxy-2',7'-dichlorofluorescein; calcein blue; 2-[(3-carboxy-2-oxidonaphthalen-1-yl)diazenyl]-4-chloro-5-methylbenzenesulfonate disodium; 5-oxo-1-(4-sulfonatophenyl)-4-[(4-sulfonatophenyl)diazenyl]-4H-pyrazole-3-carboxylate trisodium; and the like; and any combination thereof; Element 14: wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof; Element 15: wherein the halogen-terminal aliphatic alcohol is $X-(CH_2)_n-OH$ where X is bromo or chloro and n is 2-18; Element 16: wherein the halogen-terminal aliphatic alcohol is selected from the group consisting of: 3-bromoethan-1-ol, 3-chloroethan-1-ol, 4-bromopropan-1-ol, 4-chloropropan-1-ol, 5-bromopbutan-1-ol, 5-chlorobutan-1-ol, 6-bromopentan-1-ol, 6-chloropentan-1-ol, 7-bromohexan-1-ol, 7-chlorohexan-1-ol, and any combination thereof; Element 17: wherein esterifying is at about 0° C. to about 70° C.; Element 18: wherein esterifying is for about 10 minutes to about 24 hours; Element 19: wherein a molar ratio of the carboxyl-pendent optical absorber to the halogen-terminal aliphatic alcohol is about 5:1 to about 1:5; Element 20: wherein the N-alkylating is at about 100° C. to about 200° C.; Element 21: wherein the N-alkylating is for about 10 minutes to about 48 hours; and Element 22: wherein a molar ratio of the halogen-terminal alkyl-optical absorber to the polyamide is preferably about 500:1 to about 10:1. Examples of combinations include, but are not limited to, Element 13 in combination with one or more of Elements 14-22; Element 14 in combination with one or more of Elements 15-22; Element 15 in combination with one or more of Elements 16-22; Element 16 in combination with one or more of Elements 17-22; Element 17 in combination with one or more of Elements 18-22; Element 18 in combination with one or more of Elements 19-22; Element 19 in combination with one or more of Elements 20-22; Element 20 in combination with one or more of Elements 21-22; and Elements 21 and 22 in combination.

A third nonlimiting example embodiment is a composition comprising: a polyamide having an optical absorber pendent from a backbone of the polyamide, wherein the polyamide and the optical absorber are connected by an alkyl linker. The third nonlimiting example embodiment may include one or more of: Element 23: wherein the optical absorber is selected from the group consisting of: 1,2-dihydroxyanthraquinone; carminic acid; 1,3-dihydroxyanthraquinone; 1,4-dihydroxyanthraquinone; 1-hydroxy-4-(p-tolylamino)anthraquinone; 1,8-dihydroxy-3-methoxy-6-methylanthraquinone; 1,2,5-trihydroxy-6-methylanthracene-9,10-dione; calcein; 6-carboxyfluoresceinsuccinimidylester; 6-carboxyfluorescein; 2',7'-dichloro-3',6'-dihydroxy-3H-spiro[2-benzofuran-1,9'-xanthen]-3-one; fluorescein isothiocyanate; 4',5'-dibromofluorescein; 5(6)-carboxy-2',7'-dichlorofluorescein; 4-chloro-3-[(2Z)-2-[1-[5-chloro-4-[[(2Z)-2-[[2-chloro-5-[N-[2-(4-chlorophenoxy)-5-(trifluoromethyl)phenyl]-C-hydroxycarbonimidoyl]phenyl]hydrazinylidene]-3-oxobutanoyl]amino]-2-methylanilino]-1,3-dioxobutan-2-ylidene]hydrazinyl]-N-[2-(4-chlorophenoxy)-5-(trifluoromethyl)phenyl]benzenecarboximidic acid; 2-[(3-carboxy-2-oxidonaphthalen-1-yl)diazenyl]-4-chloro-5-methylbenzenesulfonate disodium; phenol dyes; 3,3-bis(4-hydroxyphenyl)-2-benzofuran-1-one; 4,8-diamino-1,5-dihydroxy-9,10-dioxoanthracene-2-sulfonate sodium; 1-amino-4-hydroxy-2-phenoxyanthracene-9,10-dione; 5-oxo-1-(4-sulfonatophenyl)-4-[(4-sulfonatophenyl)diazenyl]-4H-pyrazole-3-carboxylate trisodium; 5-chloro-2-hydroxy-3-[(3-methyl-5-oxo-1-phenyl-4H-pyrazol-4-yl)diazenyl]benzenesulfonate sodium; 2-[(4-hydroxy-9,10-dioxoanthracen-1-yl)amino]-5-methylbenzenesulfonic acid; 3,5,6,8-tetrahydroxy-1-methyl-9,10-dioxo-7-[3,4,5-trihydroxy-6-(hydroxymethyl)oxan-2-yl]anthracene-2-carboxylic acid; and the like; and any combination thereof; Element 24: wherein the alkyl linker has 2-18 carbons; Element 25: wherein the alkyl linker is has 2-6 carbons; and Element 26: wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

A fourth nonlimiting example embodiment is a method comprising: extruding a polymer melt comprising the third nonlimiting example embodiment (optionally including one or more of Elements 24-26) through an orifice to produce a film, a fiber (or a filament), particles, pellets, or the like A fifth article comprising: the polyamide of the third nonlimiting example embodiment (optionally including one or more of Elements 24-26).

A sixth nonlimiting example embodiment is a method comprising: mixing a mixture comprising a polyamide having an optical absorber pendent from a backbone of the polyamide (OAMB-polyamide), a carrier fluid that is immiscible with the OAMB-polyamide, and optionally an emulsion stabilizer at a temperature greater than a melting point or softening temperature of the OAMB-polyamide and at a shear rate sufficiently high to disperse the OAMB-polyamide in the carrier fluid; and cooling the mixture to below the melting point or softening temperature of the OAMB-polyamide to form solidified particles comprising the OAMB-polyamide and the emulsion stabilizer, when present, associated with an outer surface of the solidified particles. The sixth nonlimiting example embodiment may further include one or more of: Element 27: wherein the emulsion stabilizer is included in the mixture, and wherein the emulsion stabilizer associated with an outer surface of the solidified particles; Element 28: wherein the mixture further comprises a thermoplastic polymer that is not the OAMB-polyamide; Element 29: wherein the mixture further comprises a polyamide but without an optical absorber pendent therefrom; Element 30: wherein the optical absorber is from a family selected from the group consisting of rhodamines, fluoresceins, coumarins, naphthalimides, benzoxanthenes, acridines, cyanines, oxazins, phenanthridine, pyrrole ketones, benzaldehydes, polymethines, triarylmethanes, anthraquinones, pyrazolones, quinophthalones, carbonyl dyes, diazo dyes, perinones, diketopyrrolopyrrole (DPP), dioxazine dyes, phthalocyanines, indanthrenes, benzanthrone, violanthrones, azo dyes, phthalocyanine dyes, quinacridone dyes, anthraquinone dyes, dioxagine dyes, indigo dyes, thioindigo dyes, perynone dyes, perylene dyes, isoindolene dyes, aromatic amino acids, flavins, derivatives of pyridoxyl, derivatives of chlorophyll, and any combination thereof; Element 31: wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof; Element 32: wherein the OAMB-polyamide comprises an alkyl linker connecting the polyamide and the optical absorber; Element 33: Element 32 and wherein the alkyl linker has 2-18 carbons; Element 34: Element 32 and wherein the alkyl linker has 2-6 carbons; Element 35: wherein at least some of the solidified particles have a void comprising the emulsion stabilizer at a void/polymer interface; Element 36: Element 35 and wherein the emulsion stabilizer comprises nanoparticles and the nanoparticles are embedded in the void/polymer interface; Element 37: Element 35 and wherein the void contains the carrier fluid; Element 38: wherein the solidified particles further comprises elongated structures on the surface of the solidified particles, wherein the elongated structures comprises the OAMB-polyamide with the emulsion stabilizer associated with an outer surface of the elongated structures; Element 39: wherein the emulsion stabilizer forms a coating that covers less than 5% of the surface of the solidified particles; Element 40: wherein the emulsion stabilizer forms a coating that covers at least 5% of the surface of the solidified particles; Element 41: wherein the emulsion stabilizer forms a coating that covers at least 25% of the surface of the solidified particles; Element 42: wherein the emulsion stabilizer forms a coating that covers at least 50% of the surface of the solidified particles; Element 43: wherein the OAMB-polyamide is present in the mixture at 5 wt % to 60 wt % of the mixture; Element 44: wherein the emulsion stabilizer is present in the mixture at 0.05 wt % to 5 wt % by weight of the OAMB-polyamide; Element 45: wherein the nanoparticles have an average diameter of 1 nm to 500 nm; Element 46: wherein the carrier fluid is selected from the group consisting of: silicone oil, fluorinated silicone oils, perfluorinated silicone oils, polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof; Element 47: wherein the silicone oil is selected from the group consisting of: polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and any combination thereof; Element 48: wherein the carrier fluid has a viscosity at 25° C. of 1,000 cSt to 150,000 cSt; Element 49: wherein the carrier fluid has a density of 0.6 g/cm$^3$ to 1.5 g/cm$^3$; Element 50: wherein mixing occurs in an extruder; Element 51: wherein mixing occurs in a stirred reactor; Element 52: wherein the mixture further comprises a surfactant; Element 53: wherein the OACTP particles have a D10 of about 0.1 µm to about 125 µm, a D50 of about 0.5 µm to about 200 µm, and a D90 of about 3 µm to about 300 µm, wherein D10<D50<D90; Element 54: wherein the OACTP particles have a diameter span of about 0.2 to about 10; Element 55: wherein the OACTP particles have a D10 of about 5 µm to about 30 µm, a D50 of about 30 µm to about 70 µm, and a D90 of about 70 µm to about 120 µm, wherein D10<D50<D90; Element 56: wherein the OACTP particles have a diameter span of about 1.0 to about 2.5; Element 57: wherein the OACTP particles have a D10 of about 25 µm to about 60 µm, a D50 of about 60 µm to about 110 µm, and a D90 of about 110 µm to about 175 µm, wherein D10<D50<D90; Element 58: wherein the OACTP particles have a diameter span of about 0.6 to about 1.5; Element 59: wherein the OACTP particles have a D10 of about 75 µm to about 125 µm, a D50 of about 100 µm to about 200 µm, and a D90 of about 125 µm to about 300 µm, wherein D10<D50<D90; Element 60: wherein the OACTP particles have a diameter span of about 0.2 to about 1.2; Element 61: wherein the solidified particles have a circularity of about 0.90 to about 1.0; Element 62: wherein the solidified particles have a Hausner ratio of about 1.0 to about 1.5. Element 63: wherein the nanoparticles comprise oxide nanoparticles; Element 38: wherein the nanoparticles comprise carbon black; and Element 64: wherein the nanoparticles comprise polymer nanoparticles. Examples of combinations include, but are not limited to, two or more of Elements 27-34 in combination and optionally in further combination with one or more of Elements 35-65; two or more of Elements 33-36 in combination; two or more of Elements 44-47 in combination; Elements 51 and 52 in combination; Elements 53 and 54 in combination; Elements 55 and 56 in combination; Elements 57 and 58 in combination; one or more of Elements 51-58 in combination with Element 60 and/or Element 35; two or more of Elements 53-65 in combination; and two or more of Elements 45, 52, 63, 64, and 65 in combination.

A seventh nonlimiting example embodiment is a composition comprising: particles (solidified particles) comprising a polyamide having an optical absorber pendent from a backbone of the polyamide (OAMB-polyamide) and having a circularity of about 0.90 to about 1.0. The seventh nonlimiting example embodiment may further include one or more of: Element 53; Element 54; Element 55; Element 56; Element 57; Element 58; Element 59; Element 60; Element 61; Element 62; Element 66: wherein the particles further comprise a thermoplastic polymer that is not the OAMB-polyamide; Element 67: wherein the particles further comprise the polyamide but without an optical absorber pendent therefrom; Element 68: wherein the particles further comprise an emulsion stabilizer associated with an outer surface of the particles; Element 69: wherein at least some of the particles have a void comprising the emulsion stabilizer at a void/polymer interface; Element 70: Element 69 and wherein the emulsion stabilizer comprises nanoparticles and the nanoparticles are embedded in the void/polymer interface; Element 71: Element 69 and wherein the void contains the carrier fluid; Element 72: wherein the particles further comprises elongated structures on the surface of the solidified particles, wherein the elongated structures comprises the OAMB-polyamide with the emulsion stabilizer associated with an outer surface of the elongated structures; Element 73: wherein the emulsion stabilizer forms a coating that covers less than 5% of the surface of the solidified particles; Element 74: wherein the emulsion stabilizer forms a coating that covers at least 5% of the surface of the solidified particles; Element 75: wherein the emulsion stabilizer forms a coating that covers at least 25% of the surface of the solidified particles; Element 76: wherein the emulsion stabilizer forms a coating that covers at least 50% of the surface of the solidified particles; and Element 77: wherein emulsion stabilizer comprises nanoparticles having an average diameter of 1 nm to 500 nm. Examples of combinations include, but are not limited to, two or more of Elements 53-62 in combination; one or more of Elements 53-62 in combination with one or more of Elements 67-77; and two or more of Elements 67-77 in combination.

A eighth nonlimiting example embodiment is a method comprising: depositing OAMB-polyamide particles of the second nonlimiting example (optionally including one or more of Elements 53-62 and 67-77) upon a surface in a specified shape; and once deposited, heating at least a portion of the particles to promote consolidation thereof and form a consolidated body.

CLAUSES

Clause 1. A method comprising: esterifying a hydroxyl-pendent optical absorber with a halogen-terminal aliphatic acid to yield a halogen-terminal alkyl-optical absorber; and N-alkylating a polyamide with the halogen-terminal alkyl-optical absorber to yield a polyamide having an optical absorber pendent from the polyamide's backbone (OAMB-polyamide).

Clause 2. The method of Clause 1, wherein the halogen-terminal aliphatic acid is a chloro aliphatic acid or a bromo aliphatic acid.

Clause 3. The method of Clause 1, wherein the halogen-terminal aliphatic acid is a $C_2$ to $C_{18}$ halogen-terminal aliphatic acid.

Clause 4. The method of Clause 1, wherein the hydroxyl-pendent optical absorber is selected from the group consisting of: 1,2-dihydroxyanthraquinone; carminic acid; 1,3-dihydroxyanthraquinone; 1,4-dihydroxyanthraquinone; 1-hydroxy-4-(p-tolylamino)anthraquinone; 1,8-dihydroxy-3-methoxy-6-methylanthraquinone; 1,2,5-trihydroxy-6-methylanthracene-9,10-dione; calcein; 6-carboxyfluorescein succinimidyl ester; 6-carboxyfluorescein; 2',7'-dichloro-3',6'-dihydroxy-3H-spiro[2-benzofuran-1,9'-xanthen]-3-one; fluorescein isothiocyanate; 4',5'-dibromofluorescein; 5(6)-carboxy-2',7'-dichlorofluorescein; 4-chloro-3-[(2Z)-2-[1-[5-chloro-4-[[(2Z)-2-[[2-chloro-5-[N-[2-(4-chlorophenoxy)-5-(trifluoromethyl)phenyl]-C-hydroxycarbonimidoyl]phenyl]hydrazinylidene]-3-oxobutanoyl]amino]-2-methylanilino]-1,3-dioxobutan-2-ylidene]hydrazinyl]-N-[2-(4-chlorophenoxy)-5-(trifluoromethyl)phenyl]benzenecarboximidic acid; 2-[(3-carboxy-2-oxidonaphthalen-1-yl)diazenyl]-4-chloro-5-methylbenzenesulfonate disodium; phenol dyes; 3,3-bis(4-hydroxyphenyl)-2-benzofuran-1-one; 4,8-diamino-1,5-dihydroxy-9,10-dioxoanthracene-2-sulfonate sodium; 1-amino-4-hydroxy-2-phenoxyanthracene-9,10-dione; 5-oxo-1-(4-sulfonatophenyl)-4-[(4-sulfonatophenyl)diazenyl]-4H-pyrazole-3-carboxylate trisodium; 5-chloro-2-hydroxy-3-[(3-methyl-5-oxo-1-phenyl-4H-pyrazol-4-yl)diazenyl]benzenesulfonate sodium; 2-[(4-hydroxy-9,10-dioxoanthracen-1-yl)amino]-5-methylbenzenesulfonic acid; 3,5,6,8-tetrahydroxy-1-methyl-9,10-dioxo-7-[3,4,5-trihydroxy-6-(hydroxymethyl)oxan-2-yl]anthracene-2-carboxylic acid; and the like; and any combination thereof.

Clause 5. The method of Clause 1, wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

Clause 6. The method of Clause 1, wherein the halogen-terminal aliphatic acid is X—$(CH_2)_n$—COOH where X is bromo or chloro and n is 1-17.

Clause 7. The method of Clause 1, wherein the halogen-terminal aliphatic acid is selected from the group consisting of: bromoacetic acid, chloroacetic acid, 3-bromopropionic acid, 3-chloropropionic acid, 4-bromobutyric acid, 4-chlorobutyric acid, 5-bromovaleric acid, 5-chlorovaleric acid, 6-bromohexanoic acid, 6-chlorohexanoic acid, and any combination thereof.

Clause 8. The method of Clause 1, wherein esterifying is at about 0° C. to about 70° C.

Clause 9. The method of Clause 1, wherein esterifying is for about 10 minutes to about 24 hours.

Clause 10. The method of Clause 1, wherein a molar ratio of the hydroxyl-pendent optical absorber to the halogen-terminal aliphatic acid is about 5:1 to about 1:5.

Clause 11. The method of Clause 1, wherein the N-alkylating is at about 100° C. to about 200° C.

Clause 12. The method of Clause 1, wherein the N-alkylating is for about 10 minutes to about 48 hours.

Clause 13. The method of Clause 1, wherein a molar ratio of the halogen-terminal alkyl-optical absorber to the polyamide is preferably about 500:1 to about 10:1.

Clause 14. A method comprising: esterifying a carboxyl-pendent optical absorber with a halogen-terminal aliphatic alcohol to yield a halogen-terminal alkyl-optical absorber; and N-alkylating a polyamide with the modified optical absorber to yield a polyamide having an optical absorber pendent from the polyamide's backbone (OAMB-polyamide).

Clause 15. The method of Clause 14, wherein the carboxyl-pendent optical absorber is selected from the group consisting of: calcein; 5(6)-carboxyfluorescein; 6-carboxyfluorescein; 5(6)-carboxyfluorescein-N-hydroxysuccinimide ester; 2-pyrenepropanoic acid; 2-perylenepropanoic acid; 3,9-perylenedicarboxylic acid; 5(6)-carboxy-2',7'-dichlorofluorescein; calcein blue; 2-[(3-carboxy-2-oxidonaphthalen-1-yl)diazenyl]-4-chloro-5-methylbenzenesulfonate disodium; 5-oxo-1-(4-sulfonatophenyl)-4-[(4-sulfonatophenyl)diazenyl]-4H-pyrazole-3-carboxylate trisodium; and the like; and any combination thereof.

Clause 16. The method of Clause 14, wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

Clause 17. The method of Clause 14, wherein the halogen-terminal aliphatic alcohol is X—$(CH_2)_n$—OH where X is bromo or chloro and n is 2-18.

Clause 18. The method of Clause 14, wherein the halogen-terminal aliphatic alcohol is selected from the group consisting of: 3-bromoethan-1-ol, 3-chloroethan-1-ol, 4-bromopropan-1-ol, 4-chloropropan-1-ol, 5-bromopbutan-1-ol, 5-chlorobutan-1-ol, 6-bromopentan-1-ol, 6-chloropentan-1-ol, 7-bromohexan-1-ol, 7-chlorohexan-1-ol, and any combination thereof.

Clause 19. The method of Clause 14, wherein esterifying is at about 0° C. to about 70° C.

Clause 20. The method of Clause 14, wherein esterifying is for about 10 minutes to about 24 hours.

Clause 21. The method of Clause 14, wherein a molar ratio of the carboxyl-pendent optical absorber to the halogen-terminal aliphatic alcohol is about 5:1 to about 1:5.

Clause 22. The method of Clause 14, wherein the N-alkylating is at about 100° C. to about 200° C.

Clause 23. The method of Clause 14, wherein the N-alkylating is for about 10 minutes to about 48 hours.

Clause 24. The method of Clause 14, wherein a molar ratio of the halogen-terminal alkyl-optical absorber to the polyamide is preferably about 500:1 to about 10:1.

Clause 25. A composition comprising: a polyamide having an optical absorber pendent from a backbone of the polyamide, wherein the polyamide and the optical absorber are connected by an alkyl linker.

Clause 26. The composition of Clause 25, wherein the alkyl linker has 2-18 carbons.

Clause 27. The composition of Clause 25, wherein the alkyl linker is has 2-6 carbons.

Clause 28. The composition of Clause 25, wherein the optical absorber is selected from the group consisting of: 1,2-dihydroxyanthraquinone; carminic acid; 1,3-dihydroxyanthraquinone; 1,4-dihydroxyanthraquinone; 1-hydroxy-4-(p-tolylamino)anthraquinone; 1,8-dihydroxy-3-methoxy-6-methylanthraquinone; 1,2,5-trihydroxy-6-methylanthracene-9,10-dione; calcein; 6-carboxyfluoresceinsuccinimidylester; 6-carboxyfluorescein; 2',7'-dichloro-3',6'-dihydroxy-3H-spiro[2-benzofuran-1,9'-xanthen]-3-one; fluorescein isothiocyanate; 4',5'-dibromofluorescein; 5(6)-carboxy-2',7'-dichlorofluorescein; 4-chloro-3-[(2Z)-2-[1-[5-chloro-4-[[(2Z)-2-[[2-chloro-5-[N-[2-(4-chlorophenoxy)-5-(trifluoromethyl)phenyl]-C-hydroxycarbonimidoyl]phenyl]hydrazinylidene]-3-oxobutanoyl]amino]-2-methylanilino]-1,3-dioxobutan-2-ylidene]hydrazinyl]-N-[2-(4-chlorophenoxy)-5-(trifluoromethyl)phenyl]benzenecarboximidic acid; 2-[(3-carboxy-2-oxidonaphthalen-1-yl)diazenyl]-4-chloro-5-methylbenzenesulfonate disodium; phenol dyes; 3,3-bis(4-hydroxyphenyl)-2-benzofuran-1-one; 4,8-diamino-1,5-dihydroxy-9,10-dioxoanthracene-2-sulfonate sodium; 1-amino-4-hydroxy-2-phenoxyanthracene-9,10-dione; 5-oxo-1-(4-sulfonatophenyl)-4-[(4-sulfonatophenyl)diazenyl]-4H-pyrazole-3-carboxylate trisodium; 5-chloro-2-hydroxy-3-[(3-methyl-5-oxo-1-phenyl-4H-pyrazol-4-yl)diazenyl]benzenesulfonate sodium; 2-[(4-hydroxy-9,10-dioxoanthracen-1-yl)amino]-5-methylbenzenesulfonic acid; 3,5,6,8-tetrahydroxy-1-methyl-9,10-dioxo-7-[3,4,5-trihydroxy-6-(hydroxymethyl)oxan-2-yl]anthracene-2-carboxylic acid; and the like; and any combination thereof.

Clause 29. The composition of Clause 25, wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

Clause 30. A method comprising: depositing particles upon a surface in a specified shape, wherein the particles comprise the polyamide of Clause 25; and once deposited, heating at least a portion of the particles to promote consolidation thereof and form a consolidated body.

Clause 31. The method of Clause 30, wherein the particles further comprise a thermoplastic polymer selected from the group consisting of: polyamide, polyurethane, polyethylene, polypropylene, polyacetal, polycarbonate, polybutylene terephthalate, polyethylene terephthalate, polyethylene naphthalate, polytrimethylene terephthalate, polyhexamethylene terephthalate, polystyrene, polyvinyl chloride, polytetrafluoroethene, polyester, polyether, polyether sulfone, polyetherether ketone, polyacrylate, polymethacrylate, polyimide, acrylonitrile butadiene styrene, polyphenylene sulfide, vinyl polymer, polyarylene ether, polyarylene sulfide, polysulfone, polyether ketone, polyamide-imide, polyetherimide, polyetherester, copolymers comprising a polyether block and a polyamide block, grafted or ungrafted thermoplastic polyolefin, functionalized or nonfunctionalized ethylene/vinyl monomer polymer, functionalized or nonfunctionalized ethylene/alkyl (meth)acrylate, functionalized or nonfunctionalized (meth)acrylic acid polymer, functionalized or nonfunctionalized ethylene/vinyl monomer/alkyl (meth)acrylate terpolymer, ethylene/vinyl monomer/carbonyl terpolymer, ethylene/alkyl (meth)acrylate/carbonyl terpolymer, methylmethacrylate-butadiene-styrene type core-shell polymer, polystyrene-block-polybutadiene-block-poly(methyl methacrylate) block terpolymer, chlorinated or chlorosulphonated polyethylene, polyvinylidene fluoride, phenolic resin, poly(ethylene/vinyl acetate), polybutadiene, polyisoprene, styrenic block copolymer, polyacrylonitrile, silicone, and any combination thereof.

Clause 32. An article comprising: the polyamide of Clause 25.

Clause 33. A method comprising: mixing a mixture comprising a polyamide having an optical absorber pendent from a backbone of the polyamide (OAMB-polyamide), a carrier fluid that is immiscible with the OAMB-polyamide, and optionally an emulsion stabilizer at a temperature greater than a melting point or softening temperature of the OAMB-polyamide and at a shear rate sufficiently high to disperse the OAMB-polyamide in the carrier fluid; and cooling the mixture to below the melting point or softening temperature of the OAMB-polyamide to form solidified particles comprising the OAMB-polyamide and the emulsion stabilizer, when present, associated with an outer surface of the solidified particles.

Clause 34. The method of Clause 33, wherein the emulsion stabilizer is included in the mixture, and wherein the emulsion stabilizer associated with an outer surface of the solidified particles.

Clause 35. The method of Clause 33, wherein the mixture further comprises a thermoplastic polymer that is not the OAMB-polyamide.

Clause 36. The method of Clause 33, wherein the mixture further comprises the polyamide but without an optical absorber pendent therefrom.

Clause 37. The method of Clause 33, wherein the optical absorber is from a family selected from the group consisting of: rhodamines, fluoresceins, coumarins, naphthalimides, benzoxanthenes, acridines, cyanines, oxazins, phenanthridine, pyrrole ketones, benzaldehydes, polymethines, triarylmethanes, anthraquinones, pyrazolones, quinophthalones, carbonyl dyes, diazo dyes, perinones, diketopyrrolopyrrole (DPP), dioxazine dyes, phthalocyanines, indanthrenes, benzanthrone, violanthrones, azo dyes, phthalocyanine dyes, quinacridone dyes, anthraquinone dyes, dioxagine dyes, indigo dyes, thioindigo dyes, perynone dyes, perylene dyes, isoindolene dyes, aromatic amino acids, flavins, derivatives of pyridoxyl, derivatives of chlorophyll, and any combination thereof.

Clause 38. The method of Clause 33, wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

Clause 39. The method of Clause 33, wherein the OAMB-polyamide comprises an alkyl linker connecting the polyamide and the optical absorber.

Clause 40. The method of Clause 39, wherein the alkyl linker has 2-18 carbons.

Clause 41. The method of one of claim 39, wherein the alkyl linker has 2-6 carbons.

Clause 42. The method of Clause 33, wherein the emulsion stabilizer is included in the mixture, and wherein at least some of the solidified particles have a void comprising the emulsion stabilizer at a void/polymer interface.

Clause 43. The method of Clause 42, wherein the emulsion stabilizer comprises nanoparticles and the nanoparticles are embedded in the void/polymer interface.

Clause 44. The method of Clause 42, wherein the void contains the carrier fluid.

Clause 45. The method of Clause 33, wherein the solidified particles further comprises elongated structures on the surface of the solidified particles, wherein the emulsion stabilizer is included in the mixture, and wherein the elongated structures comprises the OAMB-polyamide with the emulsion stabilizer associated with an outer surface of the elongated structures.

Clause 46. The method of Clause 33, wherein the emulsion stabilizer is included in the mixture, and wherein the emulsion stabilizer forms a coating that covers less than 5% of the surface of the solidified particles.

Clause 47. The method of Clause 33, wherein the emulsion stabilizer is included in the mixture, and wherein the emulsion stabilizer forms a coating that covers at least 5% of the surface of the solidified particles.

Clause 48. The method of Clause 33, wherein the emulsion stabilizer is included in the mixture, and wherein the emulsion stabilizer forms a coating that covers at least 25% of the surface of the solidified particles.

Clause 49. The method of Clause 33, wherein the emulsion stabilizer is included in the mixture, and wherein the emulsion stabilizer forms a coating that covers at least 50% of the surface of the solidified particles.

Clause 50. The method of Clause 33, wherein the OAMB-polyamide is present in the mixture at 5 wt % to 60 wt % of the mixture.

Clause 51. The method of Clause 33, wherein the emulsion stabilizer is included in the mixture, and wherein the emulsion stabilizer is present in the mixture at 0.05 wt % to 5 wt % by weight of the OAMB-polyamide.

Clause 52. The method of Clause 33, wherein the emulsion stabilizer is included in the mixture, and wherein emulsion stabilizer comprises nanoparticles having an average diameter of 1 nm to 500 nm.

Clause 53. The method of Clause 33, wherein the carrier fluid is selected from the group consisting of: silicone oil, fluorinated silicone oils, perfluorinated silicone oils, polyethylene glycols, paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and any combination thereof.

Clause 54. The method of Clause 53, wherein the silicone oil is selected from the group consisting of: polydimethylsiloxane, methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and any combination thereof.

Clause 55. The method of Clause 33, wherein the carrier fluid has a viscosity at 25° C. of 1,000 cSt to 150,000 cSt.

Clause 56. The method of Clause 33, wherein the carrier fluid has a density of 0.6 g/cm3 to 1.5 g/cm3.

Clause 57. The method of Clause 33, wherein mixing occurs in an extruder.

Clause 58. The method of Clause 33, wherein mixing occurs in a stirred reactor.

Clause 59. The method of Clause 33, wherein the mixture further comprises a surfactant.

Clause 60. The method of Clause 33, wherein the OACTP particles have a D10 of about 0.1 μm to about 125 μm, a D50 of about 0.5 μm to about 200 μm, and a D90 of about 3 μm to about 300 μm, wherein D10<D50<D90.

Clause 61. The method of Clause 33, wherein the OACTP particles have a diameter span of about 0.2 to about 10.

Clause 62. The method of Clause 33, wherein the OACTP particles have a D10 of about 5 μm to about 30 μm, a D50 of about 30 μm to about 70 μm, and a D90 of about 70 μm to about 120 μm, wherein D10<D50<D90.

Clause 63. The method of Clause 62, wherein the OACTP particles have a diameter span of about 1.0 to about 2.5.

Clause 64. The method of Clause 33, wherein the OACTP particles have a D10 of about 25 μm to about 60 μm, a D50 of about 60 μm to about 110 μm, and a D90 of about 110 μm to about 175 μm, wherein D10<D50<D90.

Clause 65. The method of Clause 64, wherein the OACTP particles have a diameter span of about 0.6 to about 1.5.

Clause 66. The method of Clause 33, wherein the OACTP particles have a D10 of about 75 μm to about 125 μm, a D50 of about 100 μm to about 200 μm, and a D90 of about 125 μm to about 300 μm, wherein D10<D50<D90.

Clause 67. The method of Clause 66, wherein the OACTP particles have a diameter span of about 0.2 to about 1.2.

Clause 68. The method of Clause 33, wherein the solidified particles have a circularity of about 0.90 to about 1.0.

Clause 69. The method of Clause 33, wherein the solidified particles have a Hausner ratio of about 1.0 to about 1.5.

Clause 70. The method of Clause 33, wherein the nanoparticles comprise oxide nanoparticles.

Clause 71. The method of Clause 33, wherein the nanoparticles comprise carbon black.

Clause 72. The method of Clause 33, wherein the nanoparticles comprise polymer nanoparticles.

Clause 73. A composition comprising: particles comprising a polyamide having an optical absorber pendent from a backbone of the polyamide (OAMB-polyamide) and having a circularity of about 0.90 to about 1.0.

Clause 74. The composition of Clause 73, wherein the particles further comprise a thermoplastic polymer that is not the OAMB-polyamide.

Clause 75. The composition of Clause 73, wherein the particles further comprise the polyamide but without an optical absorber pendent therefrom.

Clause 76. The composition of Clause 73, wherein the emulsion stabilizer is included in the mixture, and wherein the particles further comprise an emulsion stabilizer associated with an outer surface of the particles.

Clause 77. The composition of Clause 73, wherein the emulsion stabilizer is included in the mixture, and wherein at least some of the particles have a void comprising the emulsion stabilizer at a void/polymer interface.

Clause 78. The composition of Clause 77, wherein the emulsion stabilizer comprises nanoparticles and the nanoparticles are embedded in the void/polymer interface.

Clause 79. The composition of Clause 77, wherein the void contains the carrier fluid.

Clause 80. The composition of Clause 73, wherein the solidified particles further comprises elongated structures on the surface of the solidified particles, wherein the emulsion stabilizer is included in the mixture, and wherein the elongated structures comprises the OAMB-polyamide with the emulsion stabilizer associated with an outer surface of the elongated structures.

Clause 81. The composition of Clause 73, wherein the emulsion stabilizer is included in the mixture, and wherein the emulsion stabilizer forms a coating that covers less than 5% of the surface of the solidified particles.

Clause 82. The composition of Clause 73, wherein the emulsion stabilizer is included in the mixture, and wherein the emulsion stabilizer forms a coating that covers at least 5% of the surface of the solidified particles.

Clause 83. The composition of Clause 73, wherein the emulsion stabilizer is included in the mixture, and wherein the emulsion stabilizer forms a coating that covers at least 25% of the surface of the solidified particles.

Clause 84. The composition of Clause 73, wherein the emulsion stabilizer is included in the mixture, and wherein the emulsion stabilizer forms a coating that covers at least 50% of the surface of the solidified particles.

Clause 85. The composition of Clause 73, wherein the emulsion stabilizer is included in the mixture, and wherein emulsion stabilizer comprises nanoparticles having an average diameter of 1 nm to 500 nm.

Clause 86. The composition of Clause 73, wherein the OACTP particles have a D10 of about 0.1 µm to about 125 µm, a D50 of about 0.5 µm to about 200 µm, and a D90 of about 3 µm to about 300 µm, wherein D10<D50<D90.

Clause 87. The composition of Clause 73, wherein the OACTP particles have a diameter span of about 0.2 to about 10.

Clause 88. The composition of Clause 73, wherein the OACTP particles have a D10 of about 5 µm to about 30 µm, a D50 of about 30 µm to about 70 µm, and a D90 of about 70 µm to about 120 µm, wherein D10<D50<D90.

Clause 89. The composition of Clause 88, wherein the OACTP particles have a diameter span of about 1.0 to about 2.5.

Clause 90. The composition of Clause 73, wherein the OACTP particles have a D10 of about 25 µm to about 60 µm, a D50 of about 60 µm to about 110 µm, and a D90 of about 110 µm to about 175 µm, wherein D10<D50<D90.

Clause 91. The composition of Clause 90, wherein the OACTP particles have a diameter span of about 0.6 to about 1.5.

Clause 92. The composition of Clause 73, wherein the OACTP particles have a D10 of about 75 µm to about 125 µm, a D50 of about 100 µm to about 200 µm, and a D90 of about 125 µm to about 300 µm, wherein D10<D50<D90.

Clause 93. The method of Clause 92, wherein the OACTP particles have a diameter span of about 0.2 to about 1.2.

Clause 62. The composition of Clause 73, wherein the solidified particles have a Hausner ratio of about 1.0 to about 1.5.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Prophetic Example 1—Preparation of Modified-Alizarin. About 1.5 mmol DMAP was added to a stirred solution of about 5.5 mmol bromoacetate in DMSO. The mixture was stirred at room temperature for 5 minutes before adding 6.0 mmol DCC. After 10 minutes, 5.5 mmol alizarin was added and stirred for 4 hours. The organic layer was separated, mixed with ethyl acetate, washed with water, and dried over $Na_2SO_4$. After evaporation of the solvent, the crude residue was purified by column chromatography using cyclohexane-EtOAc (10:1) as an eluent.

Prophetic Example 2—Preparation of Alizarin-Modified Nylon. Nylon 6, nylon 6,6, nylon 6,10, and nylon 12 were modified with the modified-alizarin prepared in Example 1.

150 mL DMSO and 5.5 mmol nylon polymer were mixed. To the mixture, 5.5 mmol potassium t-butoxide was added. The mixture was blanketed with argon and heated to a temperature of 150° C. The suspension was allowed to mix at 150° C. for about 1 hour or until most of nylon was dissolved. Next, 5.5 mmol modified alizarin was added to the flask, and the reaction was allowed to proceed overnight. The next day the reaction mixture was cooled to room temperature and precipitated into 800 mL of deionized water. The mixture comprising alizarin-modified nylon, unmodified nylon, and unreacted modified-alizarin was then isolated by filtration and repeatedly washed with water to remove the DMSO solvent. Next, the solid was rinsed with methanol to remove the water then stirred in hexanes to remove the unreacted modified-alizarin. The resulted nylon mixture (modified and unmodified) was then isolated by filtration and allowed to dry in a vacuum oven at 60° C. overnight.

These examples illustrate that optical absorbers can be modified and then reacted with polyamides to produce optical absorber-modified polyamides.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed:

1. A method comprising:
   esterifying a hydroxyl-pendent optical absorber with a halogen-terminal aliphatic acid to yield a halogen-terminal alkyl-optical absorber; and
   N-alkylating a polyamide with the halogen-terminal alkyl-optical absorber in the presence of a strong base to yield a polyamide having an optical absorber pendent from the polyamide's backbone.

2. The method of claim 1, wherein the halogen-terminal aliphatic acid is a chloro aliphatic acid or a bromo aliphatic acid.

3. The method of claim 1, wherein the halogen-terminal aliphatic acid is a $C_2$ to $C_{18}$ halogen-terminal aliphatic acid.

4. The method of claim 1, wherein the hydroxyl-pendent optical absorber is selected from the group consisting of: 1,2-dihydroxyanthraquinone; carminic acid; 1,3-dihydroxyanthraquinone; 1,4-dihydroxyanthraquinone; 1-hydroxy-4-(p-tolylamino)anthraquinone; 1,8-dihydroxy-3-methoxy-6-methyl anthraquinone; 1,2,5-trihydroxy-6-methylanthracene-9,10-dione; calcein; 6-carboxyfluorescein succinimidyl ester; 6-carboxyfluorescein; 2',7'-dichloro-3'6'-dihydroxy-3H-spiro[2-benzofuran-1,9'-xanthen]-3-one; fluorescein isothiocyanate; 4',5'-dibromofluorescein; 5(6)-carboxy-2',7'-dichlorofluorescein; 4-chloro-3-[(2Z)-2-[1-[5-chloro-4-[[(2Z)-2-[[2-chloro-5-[N-2-(4-chlorophenoxy)-5-(trifluoromethyl)phenyl]-C-hydroxycarbonimidoyl]phenyl]hydrazinylidene]-3-oxobutanoyl]amino]-2-methylanilino]- 1,3-dioxobutan-2-ylidene]hydrazinyl]-N-[2-(4-chlorophenoxy)-5-(trifluoromethyl)phenyl]benzenecarboximidic acid; 2-[(3-carboxy-2-oxidonaphthalen-1-yl)diazenyl]-4-chloro-5-methylbenzenesulfonate di sodium; phenol dyes; 3,3-bis(4-hydroxyphenyl)-2-benzofuran-1-one; 4,8-diamino-1,5-dihydroxy-9,10-dioxoanthracene-2-sulfonate sodium; 1-amino-4-hydroxy-2-phenoxyanthracene-9,10-dione; 5-oxo-1-(4-sulfonatophenyl)-4-[(4-sulfonatophenyl)diazenyl]-4H-pyrazole-3-carboxylate trisodium; 5-chloro-2-hydroxy-3-[(3-methyl-5-oxo-1-phenyl-4H-pyrazol-4-yl)diazenyl]benzenesulfonate sodium; 2-[(4-hydroxy-9,10-dioxoanthracen-1-yl)amino]-5-methylbenzenesulfonic acid; 3,5,6,8-tetrahydroxy-1-methyl-9,10-dioxo-7-[3,4,5-trihydroxy-6-(hydroxymethyl)oxan-2-yl]anthracene-2-carboxylic acid; and any combination thereof.

5. The method of claim 1, wherein the polyamide is selected from the group consisting of: polycaproamide, poly(hexamethylene succinamide), polyhexamethylene adipamide, polypentamethylene adipamide, polyhexamethylene sebacamide, polyundecaamide, polydodecaamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

6. The method of claim 1, wherein the halogen-terminal aliphatic acid is X—$(CH_2)_n$—COOH where X is bromo or chloro and n is 1-17.

7. The method of claim 1, wherein the halogen-terminal aliphatic acid is selected from the group consisting of: bromoacetic acid, chloroacetic acid, 3-bromopropionic acid, 3-chloropropionic acid, 4-bromobutyric acid, 4-chlorobutyric acid, 5-bromovaleric acid, 5-chlorovaleric acid, 6-bromohexanoic acid, 6-chlorohexanoic acid, and any combination thereof.

8. The method of claim 1, wherein esterifying is at about 0° C. to about 70° C.

9. The method of claim 1, wherein esterifying is for about 10 minutes to about 24 hours.

10. The method of claim 1, wherein a molar ratio of the hydroxyl-pendent optical absorber to the halogen-terminal aliphatic acid is about 5:1 to about 1:5.

11. The method of claim 1, wherein a molar ratio of the halogen-terminal alkyl-optical absorber to the polyamide is about 500:1 to about 10:1.

12. The method of claim 1, wherein the strong base comprises one or more of:
   sodium t-butoxide, potassium t-butoxide, magnesium t-butoxide, calcium t-butoxide, sodium t-amylate, sodium 2-methyl-2-butoxide, alkali metal amides, sodium hydride, lithium hydride, triphenylmethyl lithium, triphenylmethyl sodium, naphthalene sodium, and triphenylmethyl potassium.

* * * * *